US011080240B2

(12) United States Patent
Madisetti et al.

(10) Patent No.: US 11,080,240 B2
(45) Date of Patent: Aug. 3, 2021

(54) METHOD AND SYSTEM FOR REAL-TIME COLLABORATION AND ANNOTATION-BASED ACTION CREATION AND MANAGEMENT

(71) Applicant: Vijay Madisetti, Johns Creek, GA (US)

(72) Inventors: Vijay Madisetti, Johns Creek, GA (US); Arshdeep Bahga, Chandigarh (IN)

(*) Notice: Subject to any disclaimer, the term of this patent is extended or adjusted under 35 U.S.C. 154(b) by 0 days.

(21) Appl. No.: 16/948,254

(22) Filed: Sep. 10, 2020

(65) Prior Publication Data

US 2021/0081366 A1 Mar. 18, 2021

Related U.S. Application Data

(60) Provisional application No. 62/899,172, filed on Sep. 12, 2019, provisional application No. 62/901,881, filed on Sep. 18, 2019, provisional application No. 62/969,693, filed on Feb. 4, 2020, provisional application No. 62/989,773, filed on Mar. 15, 2020, provisional application No. 62/993,733, filed on Mar. 24, 2020, provisional application No. 62/994,306, filed on Mar. 25, 2020, provisional application No. 63/023,292, filed on May 12, 2020.

(51) Int. Cl.
| | |
|---|---|
| G06F 16/176 | (2019.01) |
| G06F 40/289 | (2020.01) |
| G06F 16/18 | (2019.01) |
| G06F 16/182 | (2019.01) |
| G06F 40/169 | (2020.01) |

(52) U.S. Cl.
CPC ......... *G06F 16/176* (2019.01); *G06F 16/182* (2019.01); *G06F 16/1815* (2019.01); *G06F 40/169* (2020.01); *G06F 40/289* (2020.01)

(58) Field of Classification Search
None
See application file for complete search history.

(56) References Cited

U.S. PATENT DOCUMENTS

| | | | |
|---|---|---|---|
| 2013/0283296 A1 | 10/2013 | Brown | |
| 2015/0227514 A1* | 8/2015 | Gillett | G06Q 10/101 707/608 |
| 2017/0132190 A1* | 5/2017 | Koutrika | G06Q 10/10 |
| 2017/0257358 A1* | 9/2017 | Ebrahimi | H04L 9/3247 |
| 2018/0165260 A1* | 6/2018 | Soni | G06F 40/166 |
| 2019/0318015 A1* | 10/2019 | Cheesman | G06F 40/166 |

OTHER PUBLICATIONS

Non-Final Office Action, U.S. Appl. No. 16/948,255, dated Jan. 7, 2021.

* cited by examiner

*Primary Examiner* — Thu N Nguyen
(74) *Attorney, Agent, or Firm* — Daniel C. Pierron; Widerman Malek, PL

(57) ABSTRACT

A method of collaborating in real-time via action creation comprising detecting an annotation on a document, parsing the annotation; generating an action record responsive to information identified from parsing the annotation, and recording a generated action record to the action database. Action records can be retrieved by users for which they are the assigned user. The annotation does not change the file content of the document.

11 Claims, 33 Drawing Sheets

EOCI Certificate

This is to certify that the document or object referred hereunder existed and was presented in the date, time and location printed down below, by the user identified as "owner/custodian".

- Certificate Identifier — 0x8805d449d856735 2ac02e71586fbec6cca89e102 — 1402
- Certificate URL — http://example.com/Gab71C — 1404
- Document/Object Name — XYZ-Invention.pdf — 1406
- Document/Object Identifier — 47527a1a936303cf9378c8cf09abd853917e9f515de65b5e460aeb3fd8eca3c — 1408
- Owner/Custodian — Bob Alan — 1410
- User Identifier — 0xc362bf0e84743633 4d8b5a3a4192825c3696b540 — 1412
- Date & Time — Fri, Nov 03, 2017, 14:22:10 GMT — 1414
- Location — 33.7490° N, 84.3880° W — 1416

CatchUP | Dashboard | Workspace | Tasks | Organisation | Invoicing | Analytics | Cloudari Inc

Tasks
- All TASKS
- # Pre-Trial
- # MSJ
- # Expert Discovery Briefs
- # Fact Discovery Briefs
- # Markman Briefs
- # Budgets
- # Invoices
- # Strategy
- # Settlement
- # Licensing
- # Validity_123
- # Validity_478
- # Infringement_123
- # Infringement_478
- # Damages_123_478

USERS
- ○ Russell Ruge (DA)
- ○ Austin Allmon (DM)
- ○ Vella Vine (DM2)
- ○ Rosita Russaw (DM3)

PINS/MENTIONS IN NOTES
- ✱ Toda
- ▼ Important
- @ Mention

Search

Rosita Russaw Jan 20, 16:20
Phasellus porttitor malesuada turpis, at ullamcorper ipsum. Integer et feugiat lectus. Integer sit amet dapibus erat.
Infographic-(info.jpg)

Vella Vine Jan20, 16:29
Vivamus maximus diam a varius vestibulum. Duis fringilla interdum urna eu feugiat.

Rosita Russaw Jan 20, 16:32
Nam efficitur auctor lacus, id commodo arcu pellentesque eget

Austin Allmon Jan 20, 16:33
Pellentesque sem mauris, imperdiet nec dictum quis, facilisis a ligula. Vestibulum enim turpis, blandit ut risus vel, tincidunt tempor turpis. Ut ut mollis urna, et viverra diam. Maecenas vel orci id est fermentum dapibus vitae eu risus.

[Add a task note ( Press Shift+Enter to send)

| TASK TITLE | |
|---|---|
| Strategy | |
| DESCRIPTION | |
| Strategy Task | |
| START DATE | END DATE |
| 2020-01-01 | 2020-02-29 |
| CLIENT | PROJECT/MATTER |
| IBM | Client Reports |
| CLIENT REF ID | MATTER REF ID |
| IBM1 | IBACM1 |
| PROJECT REF ID | TASK CODE |
| CRP1 | B100 |
| CREATED BY | ASSIGNED TO |
| PRIORITY | STATUS |
| High | In Progress |
| PROGRESS | |
| TASK | |
| Legal | |
| FOLLOWERS | |

MILESTONES

| Milestone | Deadline |
|---|---|
| Milestone-1 | 01/10/2020 |
| Milestone-2 | 01/20/2020 |
| Milestone-3 | 01/30/2020 |
| Milestone-4 | 02/09/2020 |

METHOD AND SYSTEM FOR REAL-TIME COLLABORATION AND ANNOTATION-BASED ACTION CREATION AND MANAGEMENT

RELATED APPLICATIONS

This application claims the benefit under 35 U.S.C. § 119(e) of U.S. Provisional Patent Application Ser. No. 62/899,172 filed on Sep. 12, 2019 and titled Catchup—A Next Generation Management, Scheduling and Optimization for Organization, U.S. Provisional Patent Application Ser. No. 62/901,881 filed on Sep. 18, 2019 and titled Catchup—Resource-based Project and Task Management and Crowdsourcing, U.S. Provisional Patent Application Ser. No. 62/969,693 filed on Feb. 4, 2020 and titled Catchup—Task scheduling and resource management tool with integrated architecture, U.S. Provisional Patent Application Ser. No. 62/989,773 filed on Mar. 15, 2020 and titled CatchUp—Realtime Collaboration and Annotation-based Task Creation, U.S. Provisional Patent Application Ser. No. 62/993,733 filed on Mar. 24, 2020 and titled CatchUp—Real-Time Collaboration and Annotation-Based Task Creation, U.S. Provisional Patent Application Ser. No. 62/994,306 filed on Mar. 25, 2020 and titled CatchUp—Real-Time Collaboration and Annotation-Based Task Creation and Management, U.S. Provisional Patent Application Ser. No. 63/023,292 filed on May 12, 2020 and titled CatchUp—Real-Time Task Collaboration and Event Linking to Documents, the entire content(s) of which is herein incorporated by reference.

FIELD OF THE INVENTION

The present invention relates to real-time collaboration and annotation-based task creation and management, including execution of tasks and allocation and management of resources.

BACKGROUND

Collaboration is vital in the world of business as it harnesses the best out of two or more individuals together. A typical medium or large enterprise (such as a law firm, a university, or a hospital), may have a large number of clients and multiple projects ongoing with each client. The projects can often be opaque and confusing as there are no fixed set of tasks within a project. Tasks can have creeping requirements and the workers do not know how to track or record progress, while managers cannot measure according to any agreed to measure of progress.

Teams of workers often find it challenging to do work effectively because they do not know how other employees are progressing and whether certain business-specific and organization-specific task process follows are being followed. Resources for tasks are typically not specified in advance leading to all sorts of bottlenecks and failures and unrealistic deadlines and cost figures. Users have no defense against bad reviews as they cannot show the log or proof that they did all tasks as required or they did not report their true work or progress in time. Managers cannot complain that they do not have visibility nor can they be blamed for workers who do not work. There is no history of previous tasks to learn upon, nor is there a way a new employee can quickly substitute for another existing employee who leaves or is removed from a task, or if new resources are suddenly available. Teams of workers themselves cannot do work effectively because they do not know how other employees are progressing and they can get blamed if the other worker fails. Organizational policies, affinity rules and regulatory and business guidelines depend on people and cannot be automatically enforced.

Existing point-to-point communication solutions (such as Email, SMS, WhatsApp or other Messaging apps) allow a lot of rich content to be exchanged, but it is without context. Typically labels/conversations/groups attempt to remedy this issue, by providing pseudo context based on temporal topics. Existing solutions for point-to-point communications (such as Slack and Microsoft Teams) provide context to the communications, while allowing rich content. However, these tools do not provide a mapping to business processes or short-term business tasks with deadlines and deliverables where there is focused interaction to complete a task. These tools do not allow resource allocation and nor do they add real-time capabilities beyond notifications. They add on auxiliary services like voice and video conferencing to support voice and video meetings, but there is no memory of what happened in those interactions, nor is their customization in any way.

Managing evidence strategically for trials and cases is a challenging task for law firms. The discovery phase is where law firms gather evidence or information that is used to create evidence that may be potentially used in court proceedings. This results in a lot of documents that must be managed and used in different court-related procedures and events, such as pre-trial hearings, motions for summary judgement, depositions, and Markman hearings. Not all produced documents will be final exhibits, and the process of converting documents to final admitted exhibits is long and burdensome, in a manner to support legal strategy, and requires significant efforts on the part of attorneys, clerks, legal assistants and IT staff at law firms.

Currently teams of legal staff and attorneys work together over periods of days and weeks to organize exhibits to identify exhibits that are/were intended for use, actually used, or admitted into court, and preparing folders and listings. In addition, from legal strategy point of view certain exhibits may be more suitable than others for the purposes of trial and other court procedures, and all this analysis, culling and mixing is done manually over a period of weeks and months leading up to the trial, when frankly speaking, that is the time when one is the busiest and better off doing other work like preparing witnesses and briefs. These challenges are further compounded by the distributed and remote nature of legal work.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are directed to a system and associated methods for real-time collaboration and annotation-based task creation and management.

In some embodiments, the method and systems may further comprise a task management, scheduling, execution and resource optimization environment for organizations (referred as CatchUp) that provides the following features:

Task Management: CatchUp focuses on short term tasks that require coordination. Tasks can be filtered by user (creator, assignee or follower), client, project, matter and tags.

Business Specific Task Structure: Each organization can have multiple clients. Each client can have multiple Business Specific Task Structures including matters, projects, tasks and users.

Calendar View: CatchUp provides a Calendar view for action items, tasks and meetings.

Real-time Communication: Tasks have a set of notes organized as a running timeline that is like a chat. Attachments can be added to the task notes. Users can provide immediate feedback, ask questions, request updates for tasks and add fee or expense items to tasks. CatchUp uses WebSockets and Server Sent Events (SSE) technologies to enable real-time presence, messaging and collaboration. Users can chat and collaborate in real-time though task notes or direct messages. User mentioning and hashtags are supported with task notes and messages which allows creating action items inline.

Document Management: Catchup features an enterprise grade document management system to create, share and collaborate on documents in real-time.

Document Annotation: CatchUp GlassViewer allows viewing and annotating PDF documents including comments, text highlighting, and other tools. The annotations are transmitted to the CatchUp server, which then creates action items that are then posted to a work queue. The action items then direct back to the comments/annotation when opened. While previous approaches only allow comments that do not affect the original document, the new approach in CatchUp allows executable commands to be included inside the comments and annotations. CatchUp supports annotations and comments for PDF and Office format documents.

Kanban & Action Items: CatchUp provides a Kanban view for action items. Action items can be created in multiple ways: (1) Directly from the Kanban page, (2) Mentioning users in Task Notes or Messages, (3) Mentioning users in document annotations.

Blockchain Certification: Users can certify and timestamp documents and notes on a blockchain network.

Cryptocurrency Wallet: Tasks and action items can be assigned a budget in terms of a cryptocurrency.

Wiki: Users can share knowledge and unleash collective intelligence for their business through wiki and bulletin boards.

Video Conferencing: Enterprise-grade video conferencing and online meetings capability is available within CatchUp.

Alerts: Users can set a filter to monitor when a task is running late on some deadline.

Advanced Analytics: The advanced analytics features in Catchup allow users to get a big picture on tasks and projects.

Notifications: Users can opt to receive a Daily Digest email with details on all tasks which the user has created, tasks being followed by the user and tasks assigned to the user.

Invoicing and Time/Expense Management: Users can create and export invoices in formats such as PDF, CSV, LEDES formats.

Provides Context & Content: CatchUp provides context and content as mapped to business and formal relationships driven by relationships. It allows real-time interaction, collaboration facilitation, and memorializes and facilitates all work product in a manner that it can be deliver to the client, customer or end consumer, and also allows linkage to resources for cost and resource efficiency, and allows efficient execution of business processes in a distributed context.

Secure & Customizable with On-Premises or Cloud Options: CatchUp is a highly secure and customizable platform with option of on-premises or cloud based deployment, and user interfaces optimized for all types of devices.

Additionally, embodiments of the invention are directed to a method and system of protecting confidential and sensitive information and digital objects (for example, digitally stored and manipulated information such as database records, digital documents, files, images, and other mechanisms that may contain information in digital form) stored in cloud storage and cloud databases. In certain embodiments, the present invention may provide the following advantages:

1) Prevent loss and/or theft of digital records and objects due to either insiders or outsiders, and without perceptible loss of functionality relating to the digital records and objects. Such security includes the ability to identify at an organizational level certain threats at a particular location and/or a particular time instant or window, or both. Such security also employs patterns of access and/or usage as a library of patterns to assist in threat tracking and reaction/action based on context and threat levels.

2) Employ tracking and analytics capability within a cloud to identify behaviors based on activities on system-generated traces, and also for active and invasive analysis of requests.

3) Improve the performance of cloud applications by intelligently routing storage requests to either more faster storage options, more secure storage options or more fault-tolerant storage options.

4) Automatically choose storage allocation and access based on an application's pragma directives or configuration.

5) Allow proactive action with regard to threats to digital records and objects, including tracking of theft by insiders and/or outsiders, and also controlling destruction of a digital records and object prior to theft, loss, or disclosure. Both offensive and defensive approaches may be put in place through the use of analytics capabilities in the cloud.

The advantages described above are achieved by a secure software optimized storage system (SOTER), and associated methods, comprising the following components:

1) Soter Tracer: The Soter Tracer is instrumented into the application. Tracer creates spans when database access requests from a client application are received and attaches headers, tags, meta-data and context information to the spans in explicit version, or it can derive or infer "tags" using domain intelligence in the implicit version of Soter that can then insert these headers and meta-information unknown or transparently to the application or end-client user. The headers may be used to track requests as they pass through multiple services, emitting timing and other meta-data throughout, defined as tracing data, and this information can then be reassembled to provide a complete picture of the application's database access query-level behavior at runtime.

2) Soter Agent: The Soter Agent may be deployed on every host or server. The Soter Agent listens to the tracing data (including spans) which are injected in the instrumented application and forwards the traces to the Collector in the Soter Storage Intelligence service. Agent sends trace data asynchronously and outside the critical path to the Collector over UDP. Agent can insert these trace data in the implicit approach, if needed. When a proxy is used to inject traces instead of an instrumented application, the Soter Agent listens to the tracing data (including spans) which are injected in the intercepted requests/calls by the Soter Proxy and forwards the traces to the Collector.

3) Soter Storage Firewall: Soter Storage firewall is dynamic storage firewall that allows or block requests in real-time based on the nature of the current request and previous requests. The rules in firewall are updated based on real-time analysis of storage & retrieval requests such that any inappropriate, unapproved or malicious transactions, from a single source or multiple related sources, exceeding a threshold number of requests within a threshold time period, can be blocked or flagged for increased monitoring. E.g., if an insider or IOT device is trying to repeatedly query customer database and retrieve sensitive data, in some embodiments data of a single category or type (Social Security numbers, phone numbers, etc.), subsequent requests may be blocked. It is contemplated and included within the scope of the invention that the Soter Storage firewall may be a discrete piece of computer hardware or may be a virtual firewall executed on a computerized device that also executes other software.

4) Soter Storage Router: Storage Router identifies or inserts tags/headers that are associated with storage requests that allow it to choose between storage options such as (1) secure areas for storage of certain types of tagged data, or (2) faster locations for access, or (3) more fault-tolerant features. It is contemplated and included within the scope of the invention that the Soter Storage router may be a discrete piece of computer hardware or may be a virtual router executed on a computerized device that also executes other software.

5) Soter Storage Intelligence: Trace data is collected in the Collector component of the Soter Storage Intelligence service. Analysis of tagged requests or trace data is done in Analytics component of the Storage Intelligence service which collects and analyzes the traces and then updates the routing and firewall rules based on the analysis of requests and application's behavior at runtime. It is contemplated and included within the scope of the invention that the Soter Storage Intelligence service may be a discrete piece of computer hardware or may be a service executed on a computerized device that also executes other software.

6) Soter Monitoring Dashboard: The monitoring dashboard presents real-time monitoring information on requests, anomalous requests detected, threats identified and blocked.

7) Soter Proxy: The Soter Proxy acts like a trusted man-in-the-middle intercepting the storage requests or database calls. The Soter proxy creates traces for the intercepted calls and sends the traces to the Soter Agent. By using a proxy, there is no need to instrument the application with tracers. The proxy is able to intercept the client-server communication (such as database queries (n SQL, for example) or calls and requests to store data items/objects in a cloud database or storage) and inject traces.

While existing approaches such as Distributed Tracing are meant only for monitoring purposes, the SOTER approach can be used not just for observing or monitoring, but can also play an active role through use of headers that are read and updated along the request path. The SOTER approach also supports tags inserted by domain experts who know certain items need more speed, more safety, more protection, or more fault tolerance. For example, credit card data need to be stored in protected areas, and their transactions should be fast. The Soter Storage Router can choose between storage options such as Cloud Object Storage (such as AWS S3) or NoSQL database (such as DynamoDB or MongoDB) or SQL database (such as MySQL on RDS), within a cloud computing environment, for instance, using these tags (explicit mechanism). Alternatively, in the implicit approach the Soter Storage Router can derive the "tags" implicitly using "domain information". For example, it uses knowledge or Artificial Intelligence (AI) to determine that "financial information" or "personal information" must be stored in secure containers or trusted areas, as opposed to generic program state information that need not be stored in protected areas.

A database or cloud storage equipped with Soter components handles the QoS issues transparently based on the headers. Headers are used for storage (data in rest), where the headers route the information to more secure areas, or more fast access areas or more reliable areas or where they can be monitored. Soter does invasive analysis and optimization and not just passive tracing of requests.

Existing approaches such as Software-defined storage can improve the application performance by virtualizing the back-end storage and transforming it into a pool of capacity that servers can utilize. However, the SOTER approach allows more fine-grained control over the storage locations for individual data records/objects through use of headers that are read and updated along the request path.

Additionally, embodiments of the invention are directed to a method of organizing client application data comprising receiving a client application database access request for creating or modifying client application data from a client application executing on a computerized device at a cloud-based server, deriving a tag associated with the client application database access request at a storage router, the tag indicating storage requirements for at least one of security, access speed, or fault tolerance, receiving tracing information related to the client application database access request at a storage intelligence service, defining received tracing information in terms of the tag and client application attributes comprising at least one of users, roles, privileges, database access patterns, and usage characteristics, storing the received tracing information in a cloud-based trace storage database, analyzing the trace storage database to develop updated rules for client application database access requests, and updating the storage intelligence service with the updated rules. The method may further comprise mapping the client application database access request at the storage router to a corresponding server database access request record created or modified responsive to the tag derived from the client application database access request and a rule comprised by the storage router and storing the mapping in a cloud-based mapping database. The method may further comprise receiving a client database read access request from a client application, receiving tracing information associated with the client database read access request from the client application at the storage intelligence service, and routing the client database read access request from the client application based on the rules stored in the storage intelligence service and the mapping database to a corresponding cloud-based server database record. The method may additionally comprise receiving data from the corresponding cloud-based server database record responsive to the client database read access request, defining retrieved data and transmitting the retrieved data to the client application.

In some embodiments, the step of deriving a tag associated with the client application database access request at the storage router may comprise determining the client application database access request does not have a tag assigned thereto, analyzing the data comprised by the client application database access request, and inserting a tag into the client application database access request responsive to the analysis of the data comprised by the client application database access request. The step of deriving a tag associated with the client application database access request at the storage router may comprise identifying a tag comprised by the client application database access request.

In some embodiments, the mapping database may be organized as a distributed hash table. The mapping database may be replicated for fault-tolerance and availability.

In some embodiments, the method may further comprise determining a probable future client database read access request responsive to the tag and the tracing information associated with the client application database access request at the storage intelligence service.

In some embodiments, the method may further comprise receiving a plurality of client database read access requests from a single source at the cloud-based server, receiving tracing information for each of the plurality of client database read access requests at the storage intelligence service, analyzing the tracing information associated with the plurality of client database read access requests at the storage intelligence service to determine if a threshold number of requests within a threshold time period is exceeded, and, upon determining the threshold number of requests within the threshold time period is exceeded, flagging subsequent client database read access requests from the source for increased monitoring.

In some embodiments, the method may further comprise receiving a plurality of client database read access requests from a single source at the cloud-based server, receiving tracing information for each of the plurality of client database read access requests at the storage intelligence service, analyzing the tracing information associated with the plurality of client database read access requests at the storage intelligence service to determine if a threshold number of requests for read access of data a single category is exceeded, and, upon determining the threshold number of requests for read access of data of a single category is exceeded, flagging subsequent client database read access requests from the source for increased monitoring.

In some embodiments, the data comprised by either of the client application database access request or the client database access read request may be formatted for a first database type, and the method may further comprise determining if the first database type matches a database type associated with a database type of the corresponding server database access request record and, upon determining the first database type does not match the database type of the corresponding server database access request record, converting the first database type to a second database type that matches the database type of the corresponding server database access request record. The first database and second database types may be one of a SQL or a NoSQL type.

In some embodiments, the retrieved data may not comprise or may exclude information indicating a geographic location or an internet protocol location of the server comprising the cloud-based server database record.

In some embodiments, receiving the client application database access request may comprise receiving the client application database access request at a load balancer, adding tracing information to the client application database access request responsive to receiving the client application database access request at the load balancer, defined as load balancer tracing information, sending the load balancer tracing information to the storage intelligence service, sending the client application database access request to an application server of a plurality of application servers, receiving the client application database access request at the application server of the plurality of application servers, adding tracing information to the client application database access request responsive to receiving the client application database access request at the application server, defined as application server tracing information, and sending the application server tracing information to the storage intelligence service.

Further embodiments of the invention are directed to a method of optimizing performance of and securing cloud storage and databases comprising analyzing data comprised by a data request generated by a client application by an agent application on a computerized device, inserting a tag into the data request responsive to the analysis of the data comprised by the data request, the tag indicating storage requirements for at least one of security, access speed, or fault tolerance, identifying tracing information added to a data request transmitted by the client application, and transmitting the tracing information to a storage intelligence service.

In some embodiments, the tracing information may be transmitted to the storage intelligence service a pathway other than a pathway through which the data request was transmitted. The tracing information may comprise one or more of a span and a trace. The agent application may be executed by one of a client computerized device, a load balancer, a proxy server, or an application server. The method may further comprise adding tracing information to the data request.

Additionally, embodiments of the invention may be directed to a method of issuing blockchain-based digital certificates comprising receiving from a user hashed user identification information and object information recording to a digital certificate smart contract deployed at a digital certificate smart contract address on a blockchain network the hashed user identification information and object information and a timestamp of when the hashed user identification information and the object information were received, defined as a received timestamp, signing the digital certificate smart contract with an issuer signature, and performing a user identity verification process to confirm a user identity. Upon confirming the user identity, the method may further comprise generating a combination certificate configured to be shared by the user to verify the user's ownership of an object associated with the object information and sending the combination certificate to the user.

In some embodiments, the object information may be derived from a digital object comprising content; and wherein the object information comprises a unique identifier generated by applying a cryptographic hash function to the content of the digital object. The object information may alternatively be derived from a physical object comprising an object identifier; and wherein the object information comprise a unique identifier generated by applying a cryptographic hash to the object identifier of the physical object.

In some embodiments the method may further comprise receiving an combination certificate from a consumer, defining a received combination certificate, performing an combination certificate verification process on the received ownership certification to verify the received combination certificate and upon verifying the received combination certificate, sending a confirmation verification response to the consumer. The method may further comprise generating a combination certificate hash value by applying a hash function to the received combination certificate and recording the combination certificate hash value to the digital certificate smart contract. The combination certificate verification process may comprise identifying a signature of the received combination certificate, obtaining a received digital certificate smart contract address from the received combination certificate, generating a query hash value by applying a hash function to the received combination certificate, looking up the combination certificate on the digital certificate smart contract at the digital certificate smart contract address, verifying the query hash value matches an combination certificate hash value comprised by the digital certificate smart contract, verifying the signature of the combination certificate matches the issuer signature of the digital certificate smart contract, and verifying the combination certificate is valid and active.

In some embodiments, the method may further comprise receiving from the user a digital certificate smart contract address, hashed user identification information signed by a private key of the user, and hashed object information, obtaining a user certification record address from a digital certificate smart contract at the digital certificate smart contract address, obtaining a sealed user record address, a sealed verification record address, and a token from a user certification record at the user certification record address, retrieving hashed user identification information, defined as retrieved user identification information, from a sealed user record at the sealed user record address, and decrypting the received user identification information using the user's public key, defining decrypted user identification information. The decrypted user identification information with the retrieved user identification information may be compared. The method may further comprise retrieving a hashed verification record from a sealed verification record at the sealed verification record address, determining if the token from the user certification record address is valid, generating a generated verification record comprising the retrieved user identification information and the token; generating a hashed generated verification record by applying a hash function to the generated verification record, and comparing the hashed generated verification record to the hashed verification record. The method may further comprise retrieving object information, defining retrieved object information, from the digital certificate at the digital certificate address, comparing the retrieved object information with the hashed object information, and retrieving from the digital certificate smart contract a timestamp, defining a retrieved timestamp. Upon determining the decrypted user identification information with the retrieved user identification information are at least a partial match, the hashed generated verification record to the hashed verification record are at least a partial match, and the retrieved object information and the hashed object information are at least a partial match, the method may further comprise sending to the user the retrieved user identification information, the retrieved object information, and the retrieved timestamp.

In some embodiments, performing the user validation process may comprise receiving from the user a user certification record address, hashed user identification information that has been signed with a private key of the user defined as received user identification information, hashed object information defined as received object information, and a user public key, obtaining each of a sealed user record address, a sealed verification record address, and a token from a user certification record address at the user certification record address, retrieving hashed user identification information from a sealed user record at the sealed user record address, defining retrieved user identification information, decrypting the received user identification information using the user public key, defining decrypted user identification information, and comparing the decrypted user identification information with the retrieved user identification information. Performing the user validation process may further comprise retrieving a hashed verification record from a sealed verification record at the sealed verification record address, defining a retrieved verification record, and determining if the token from the user certification record address is valid. Upon determining the token from the user certification record address is valid, performing the user validation process may further comprise generating a generated verification record comprising the retrieved user identification information and the token, generating a hashed verification record by applying a hash function to the generated verification record, comparing the hashed verification record with the retrieved verification record, and confirming the user identity by determining the decrypted user identification information and the retrieved user identification information are at least a partial match and the hashed verification record and the retrieved verification record are at least a partial match.

In some embodiments, generating the combination certificate may comprise generating a combination certificate comprising the user's certification record address, the received object information, and the received timestamp, generating a combination certificate hash value from a hash function including the combination certificate as an input, encrypting the combination certificate hash value with an issuer private key, defining an issuer signature, signing the combination certificate with the issuer signature, defining a signed combination certificate, and recording the signed combination certificate to the digital certificate smart contract.

In some embodiments the method may further comprising recording to the digital certificate smart contract a location of the user when the user identification information and the object information were received. In some embodiments, the blockchain network may support at least one decentralized consensus protocols of proof-of-work proof-of-stake, proof-of-activity, proof-of-burn, proof-of-capacity, and proof-of-elapsed time.

Additionally, embodiments of the invention may be directed to a method of issuing blockchain-based digital certificates comprising receiving from a user a user certification record address, hashed user identification information that has been signed with a private key of the user defined as received user identification information, hashed object information defined as received object information, and a user public key, recording to a digital certificate smart contract deployed at a digital certificate smart contract address on a blockchain network the received user identification information and the received object information and a timestamp of when the received user identification information and the received object information were received, defined as a received timestamp, and signing the digital certificate smart contract with an issuer signature. The method may further comprise performing a user validation process comprising obtaining each of a sealed user record address, a sealed verification record address, and a token from a user certification record address at the user certification record address, retrieving hashed user identification information from a sealed user record at the sealed user record address, defining retrieved user identification information, decrypting the received user identification information using the user public key, defining decrypted user identification information, comparing the decrypted user identification information with the retrieved user identification information, retrieving a hashed verification record from a sealed verification record at the sealed verification record address, defining a retrieved verification record, and determining if the token from the user certification record address is valid. Upon determining the token from the user certification record address is valid, the user validation process may further comprise generating a generated verification record comprising the retrieved user identification information and the token, generating a hashed verification record by applying a hash function to the generated verification record, comparing the hashed verification record with the retrieved verification record and confirming a user identity by determining the decrypted user identification information and the retrieved user identification information are at least a partial match and the hashed verification record and the retrieved verification record are at least a partial match. Upon confirming the user identity, the method may further comprise generating a combination certificate comprising the user's certification record address, the object information, and the timestamp, configured to be shared by the user to verify the user's ownership of an object associated with the object information, generating a combination certificate hash value from a hash function including the combination certificate as an input, encrypting the combination certificate hash value with an issuer private key, defining an issuer signature, signing the combination certificate with the issuer signature, defining a signed combination certificate, recording the signed combination certificate to the digital certificate smart contract, and sending the combination certificate to the user.

Furthermore, embodiments of the invention may be directed to a system for issuing blockchain-based digital certificates comprising a processor, a data store positioned in communication with the processor; and a network communication device positioned in communication with each of the processor, the data store, and a network. The network communication device may be operable to receive from a user hashed user identification information, object information, and a user public key. The processor may be operable to record to a digital certificate smart contract deployed at a digital certificate smart contract address on a blockchain network the hashed user identification information and object information and a timestamp of when the hashed user identification information and the object information were received, defined as a received timestamp, and to sign the digital certificate smart contract with an issuer signature. Furthermore, the system may be operable to perform a user identity verification process to confirm a user identity, comprising the network communication device obtaining each of a sealed user record address, a sealed verification record address, and a token from a user certification record address at the user certification record address, the network communication device retrieving hashed user identification information from a sealed user record at the sealed user record address, defining retrieved user identification information, the processor decrypting the received user identification information using the user public key, defining decrypted user identification information, the processor comparing the decrypted user identification information with the retrieved user identification information, the network communication device retrieving a hashed verification record from a sealed verification record at the sealed verification record address, defining a retrieved verification record, and the processor determining if the token from the user certification record address is valid. The processor may be further operable to, upon determining the token from the user certification record address is valid, generate a generated verification record comprising the retrieved user identification information and the token; generate a hashed verification record by applying a hash function to the generated verification record, compare the hashed verification record with the retrieved verification record, and confirm a user identity by determining the decrypted user identification information and the retrieved user identification information are at least a partial match and the hashed verification record and the retrieved verification record are at least a partial match.

Additionally, the processor may be operable to, upon the user identity being confirmed, generate a combination certificate configured to be shared by the user to verify the user's ownership of an object associated with the object information. The network communication device may further be operable to send the combination certificate to the user.

Further embodiments of the invention are directed to a method of collaborating in real-time via action creation, the method being performed by a server comprising a user database comprising a plurality of users, a client database comprising a plurality of client records, a matter database comprising a plurality of matter records with each matter record being associated with a client record, a project database comprising a plurality of project records with each project record being associated with a matter record, and a action database comprising a plurality of action records, the method comprising detecting a user has opened a managed document, detecting an annotation on the managed document, parsing the annotation, generating an action record responsive to information identified from parsing the annotation, the action record comprising at least one of a received client being a client of the plurality of clients, a received matter being a matter of the plurality of matters that is associated with the received client, and a received project being a project of the plurality of projects that is associated with the received matter, a received action, and an assigned user being a user of the plurality of users. The method further comprises recording a generated action record to the action database, the action record comprising at least one of a link to the client record associated with the received client, a link to the matter record associated with the received matter, and a link to the project record associated with the received project, the received action, a link to the user record associated with the assigned user, a link to a user record from which the record creation request was received, defining a creating user, and an assignment date being the date the action record creation request was received. Each user of the plurality of users can access the action database and retrieve action records for which they are the assigned user. The annotation does not change the file content of the stored inbound document.

In some embodiments, the method may further comprise sending a message to the assigned user via at least one of email and a messaging service.

In some embodiments, each action record comprises a plurality of note records, each note record comprising an authoring user and note content, the method further comprising receiving a note record request from a user comprising received note content for the generated action record and recording a note record to the generated action record, the note record comprising an authoring user being the user from which the note record request was received and the received note content. The server may be configured to display the plurality of note records comprised by an action record on a user device in the order the plurality of note records were created. The note content may comprises a link to at least one of a client record, a matter record, a project record, and an action record.

In some embodiments, each managed document may be associated with a client record of the client database, a project record of the project database, and a matter record of the matter database, and the links to the client record, matter record, and project record for the generated action record are generated responsive to the client record, matter record, and project record associated with the managed document.

In some embodiments, the method may further comprise identifying the associated user from the annotation when the annotation is received.

In some embodiments, the method may further comprise identifying the action when the annotation is received.

In some embodiments, the generated action record may further comprise a link to a managed document, defined as a linked managed document, and the method may further comprise receiving a user input selecting the generated action record from a user device transmitting a command to the user device to open the linked managed document.

In some embodiments, the method may further comprise recording the generated action record to a blockchain network at a blockchain address, receiving blockchain certification information responsive to recording the generated action record on the blockchain network, and adding the blockchain certification information to the generated action record. In some embodiments, the server may be a cloud server In some embodiments, the method may further comprise receiving an indication the user has opened the managed document and receiving an indication an annotation was added to the managed document. The indications may be received at the server via REST over HTTP.

In some embodiments, the server may further comprise a database for storing annotation records and the method may further comprise generating an annotation record responsive to information generated by parsing the annotation, the annotation record comprising the annotation location within the manage document with which the annotation is associated, a comment, a creating user, and an assigned user. In further embodiments, the server may further comprise a document record database and document storage. The managed document may be stored in the document storage and document metadata is stored in a document record on a document record database, the document record comprising a link to the managed document on the document storage, a document owner, and a link to an annotation record related to the managed document.

Further embodiments of the invention are directed to a server for collaborating in real-time via action creation comprising a storage medium having stored thereon a user database comprising a plurality of users, a client database comprising a plurality of client records, a matter database comprising a plurality of matter records with each matter record being associated with a client record, a project database comprising a plurality of project records with each project record being associated with a matter record, and an action database comprising a plurality of action records, a network communication device configured to receive an indication a user has opened a managed document and receive an annotation associated with the managed document, and a processor operatively coupled to each of the storage medium and the network communication device, the processor being configured to parse the annotation and generate an action record responsive to information identified from parsing the annotation, the action record comprising at least one of a received client being a client of the plurality of clients, a received matter being a matter of the plurality of matters that is associated with the received client, and a received project being a project of the plurality of projects that is associated with the received matter, a received action, and an assigned user being a user of the plurality of users. The processor may further be configured to recording a generated action record to the action database comprising at least one of a link to the client record associated with the received client, a link to the matter record associated with the received matter, and a link to the project record associated with the received project, the received action, a link to the user record associated with the assigned user, a link to a user record from which the record creation request was received, defining a creating user, and an assignment date being the date the action record creation request was received. Each user of the plurality of users may be able to access the action database and retrieve action records for which they are the assigned user. The annotation does not change the file content of the stored inbound document.

In some embodiments, the processor may be configured to configured to send a message to the assigned user using at least one of email and a messaging service via the network communication device.

In some embodiments, each action record may comprise a plurality of note records, each note record comprising an authoring user and note content, wherein. The network communication device may be further configured to receive a note record request from a user comprising received note content for the generated action record, and the processor may be further configured to record a note record to the generated action record, the note record comprising an authoring user being the user from which the note record request was received and the received note content. The processor may further be configured to send the plurality of note records comprised by an action record for display on a user device in the order the plurality of note records were created via the network communication device. In further embodiments, the note content may comprise a link to at least one of a client record, a matter record, a project record, and an action record.

In some embodiments, each managed document may be associated with a client record of the client database, a project record of the project database, and a matter record of the matter database. The links to the client record, matter record, and project record for the generated action record may be generated responsive to the client record, matter record, and project record associated with the managed document.

In some embodiments, the processor may be configured to identify the associated user from the annotation when the annotation is received. In some embodiments, the processor may be further configured to identify the action when the annotation is received.

In some embodiments, the generated action record may further comprise a link to a managed document, defined as a linked managed document. The network communication device may be further configured to receive a user input selecting the generated action record from a user device and transmit a command to the user device to open the linked managed document.

In some embodiments, the network communication device is further configured to transmit the generated action record to a blockchain network at a blockchain address for recordation thereon and receive blockchain certification information responsive to recording the generated action record on the blockchain network. Additionally, the processor may be further configured to add the blockchain certification information to the generated action record.

In some embodiments, the network communication device may be further configured to receive an indication the user has opened the managed document and receive an indication an annotation was added to the managed document. The indications may be received at the server via REST over HTTP.

BRIEF DESCRIPTION OF THE DRAWINGS

FIG. 16 is an illustration of an example of a combined proof of ownership, existence, custody and integrity certificate, according to an embodiment of the invention.

FIG. 22 is an exemplary interface of the CatchUp platform showing dashboard home page, according to an embodiment of the invention.

FIG. 24 is an exemplary interface of the CatchUp platform showing kanban view of action items, according to an embodiment of the invention.

FIG. 31 is an exemplary interface of the CatchUp platform showing blockchain certification for a document, according to an embodiment of the invention.

FIG. 32 is an exemplary interface of the CatchUp platform showing task notes and real-time communication, according to an embodiment of the invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
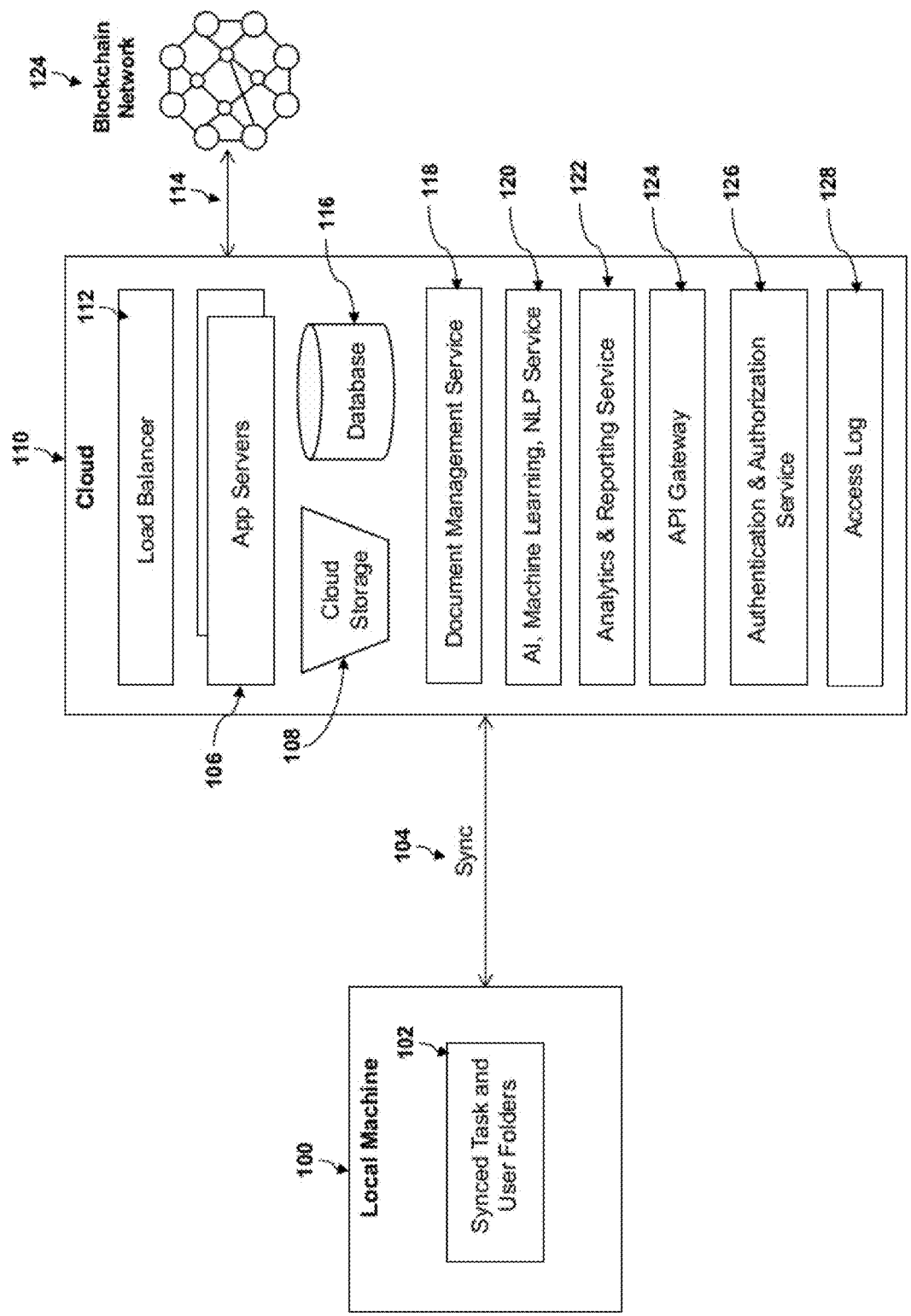
FIG. 1 is a schematic block diagram of a cloud-based host environment and a local synced folder according to an embodiment of the present invention.

Referring now to FIG. 1 a schematic block diagram of a cloud-based host environment and a local synced folder is described in more detail. The cloud-based host environment 110 configured in data communication with a local machine 100 (e.g., computer, or a smartphone) that may host a synchronized user and task folders 102. The cloud-based host environment 110 may control the creation, lifecycle and destruction of digital objects (for example, and without limitation, data artifacts such as documents, software, video, images and music). Such digital objects may be synchronized from the host environment 110 to the user and task folders 102 hosted on the local machines 100, and also may be secured such that the digital objects may not be viewed, deleted, stored, edited, or copied without permission, knowledge and control of the host environment 110. The digital objects may be stored and replicated in the cloud-based host environment 110 comprising application servers 106 placed under a load balancer 112. The cloud-based host environment 110 may include a cloud storage 108 configured for storage of digital objects. A document management service 118 may control the digital objects' lifecycles. A database 116 within the cloud environment 110 may maintain information about the digital objects, user IDs of the object owners, object creation timestamps, change logs recording changes in object state, transactions executed or attempted, and object permissions. An Artificial Intelligence (AI), Machine Learning and Natural Language Processing (NLP) service 120 enables automated extraction of meta-data from digital objects (such as creation dates, document identifiers, document number, description and security specification). The analytics and reporting service 122 may employ big data tools and frameworks for batch or real-time analytics (as described in more detail below) on available databases and meta-databases, for instance, to analyze documents, digital object access logs and network traffic. The cloud environment 110 may further include application programming interface (API) gateway 124 that exposes APIs for creating, updating, and deleting digital objects, and for operating authentication and authorization and analytics and reporting functions. These APIs may be used for developing document management and analytics applications that operate within an organization's network. For implementing the components within the cloud-based host environment 110, micro-services architectures may be used whereby each service may perform a predefined set of actions and may communicate with other services through the use of inter-service communication mechanisms such as request-response (e.g. REST over HTTP), publish-subscribe (e.g. MQTT), remote procedure call (RPC) (e.g. Thrift), or notifications. In certain embodiments of the present invention, these services may be developed, deployed and scaled independently. A blockchain network 124 is used for certifying and timestamping documents/objects stored with the cloud environment 110 that establishes the proof of existence, ownership, custody and integrity of such documents/objects.

In certain embodiments of the present invention, security features for advantageously providing secure access to the cloud-based host environment 110 may include one or more of the following:

1) Authorization Services: As a matter of definition, authorization refers to digitally specifying access rights to protected resources using access policies. The cloud-based host environment 110 may include authorization services such as policy management, role management and role-based access control. A role-based access control framework may be used to provide access to digital objects in the cloud environment 110 to users based on the assigned roles and data access policies. The cloud environment may support "OAuth," an open standard for authorization that allows resource owners to share their private resources stored on one site with another site without handing out the credentials.

2) Identity Management Services: Identity management services may provide consistent methods for identifying persons and maintaining associated identity attributes for users across multiple organizations. For example, and without limitation, Federated Identity Management (FidM) may be enforced for the host 100. FidM provides the ability to establish trust relationships between various security domains to enable the passing of authentication, authorization and privacy assertions.

3) Authentication Services: The cloud environment 110 may support authentication services 126 configured to prevent digital objects from being accessed by unauthorized users. For example, and without limitation, authentication and authorization services 126 may include a Single Sign On (SSO) that may enable users to access multiple applications after signing in for a first time. In addition to SSO, One Time Password (OTP) security may also be enforced. OTPs may be delivered via SMS and email. One benefit of OTP is that such security regimes are not vulnerable to replay attacks.

4) Data Encryption: The cloud environment 110 may adopt a data encryption standard such as the Advanced Encryption Standard (AES) for encrypting all data that is stored in the host. In addition to encryption of stored data, all transmission of data may be protected with Secure Socket Layer (SSL) encryption technology.

Figure 2:
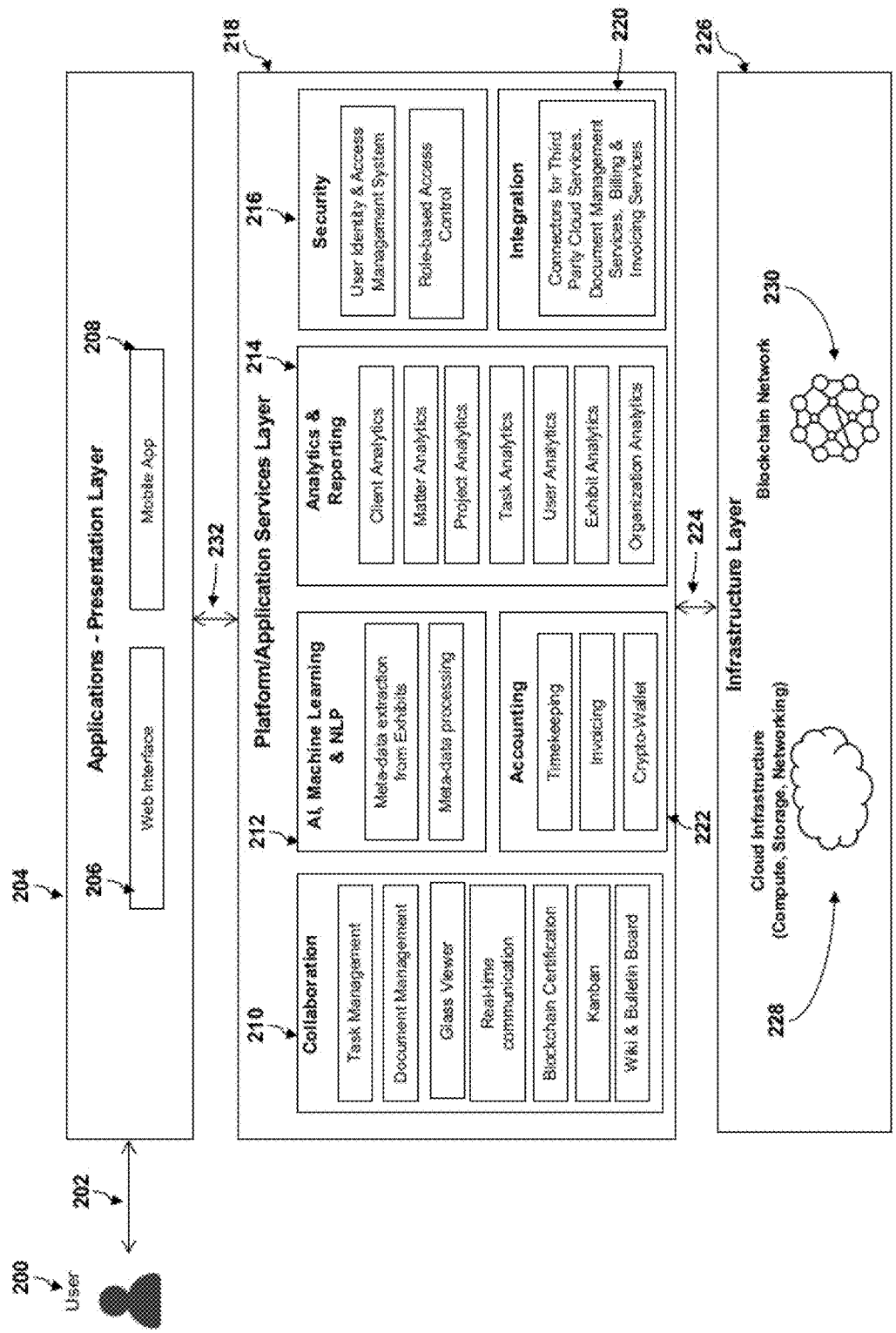
FIG. 2 is a schematic diagram of the CatchUp real-time collaboration and annotation-based task creation and management platform, according to an embodiment of the invention.

Referring now to FIG. 2 is a schematic diagram of the CatchUp real-time collaboration and annotation-based task creation platform, is described in more detail. A user 200 may interact with the platform through use of an application and presentation layer 204. The application and presentation layer 204 may comprise a web interface 206 and/or a mobile application 208. Elements of the application and presentation layer 204 may be the client-facing element of a platform/application services layer 218. The platform/application services layer 218 may comprise security features 216, such as a user identity and access management system and role-based access control. The platform/application services layer 218 may further comprise integration services 220, such as, for example, Connectors for Third Party Cloud Services, Document Management Services, Billing & Invoicing Services. The platform/application services layer 218 may further comprise collaboration features 210. The collaboration features 210 may include task management, document management, Glass Viewer, real-time communication, blockchain certification, kanban, wiki and bulletin board. The platform/application services layer 218 may further comprise accounting services 222, such as timekeeping, invoicing and cryptocurrency wallet. The platform/application services layer 218 may further comprise analytics and reporting services 214, for client analytics, matter analytics, project analytics, task analytics, user analytics, exhibit analytics and organization analytics. The platform/application services layer 218 may function on an infrastructure layer 226 that may comprise one or more of cloud infrastructure 228 (such as cloud computational resources, cloud storage resources, or cloud networking resources) and blockchain network 230.

Figure 3:
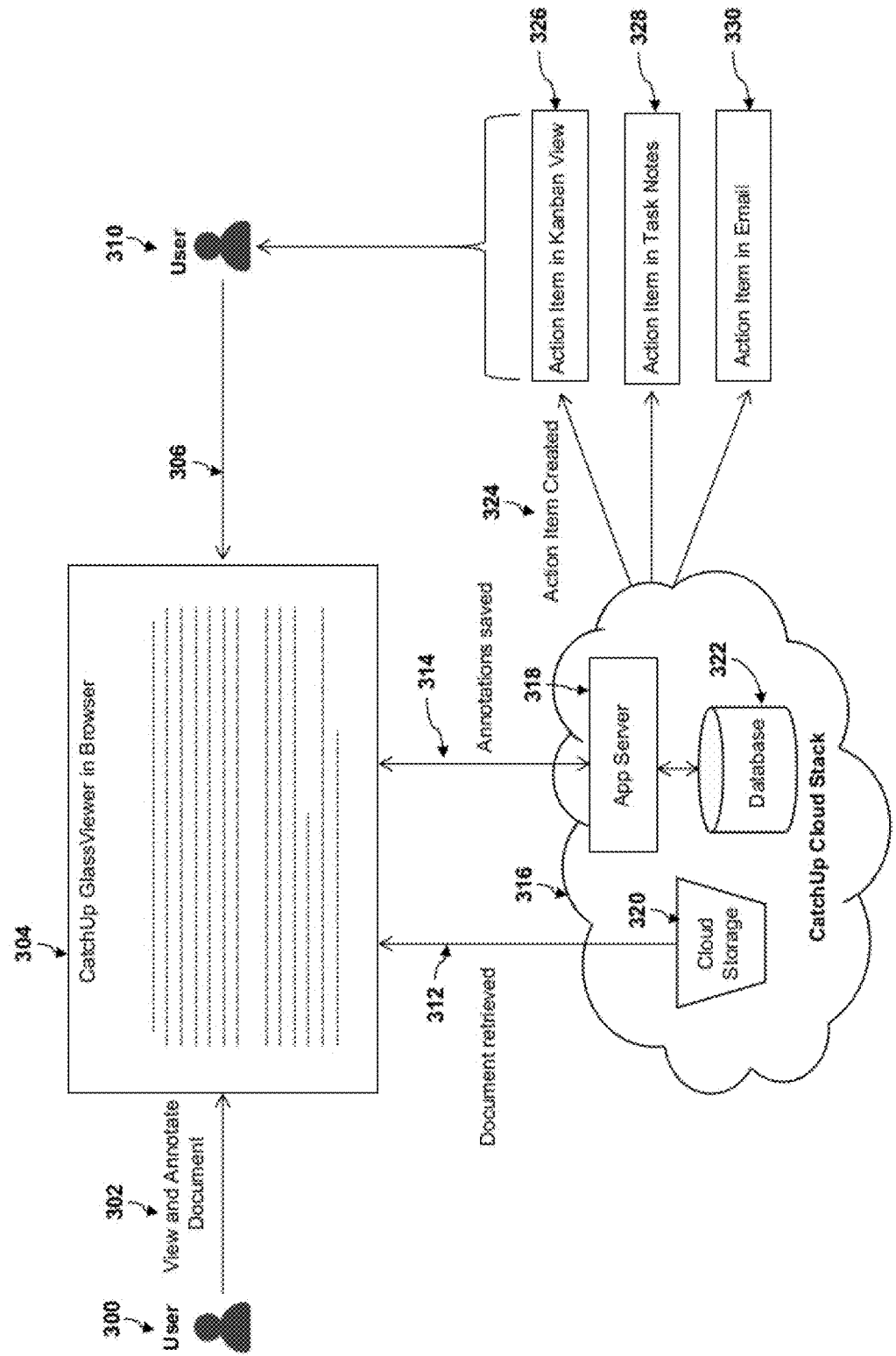
FIG. 3 is an illustration of the round-trip process of creating action items from annotations, according to an embodiment of the invention.

Referring now to FIG. 3 is an illustration of the round-trip process of creating action items from annotations, is described in more detail. CatchUp features an enterprise grade document management system to create, share and collaborate on documents in real-time. A user 300 may view and annotate a document stored with the Cloud Storage 320 that is a part of the CatchUp Cloud Stack 316 using the CatchUp GlassViewer 304. The documents stored in the Cloud Storage 320 may be defined as managed documents and may be accessed by users by requesting to open the document, whereupon the CatchUp Cloud Stack 316 may transmit the managed document to the CatchUp GlassViewer 304 on the requesting user's device. Documents may be added to the Cloud Storage (document storage) 320 by sending a document to the CatchUp Cloud Stack 316 along with a request to store the document, whereupon the CatchUp Cloud Stack 316 may store the document in the Cloud Storage 320 and make the document available to be opened in the CatchUp GlassViewer 320. The CatchUp GlassViewer 304 allows viewing and annotating documents including comments, text highlighting, and other tools. The annotations are transmitted to the application server 318, which then creates action items that are then posted to a kanban view 326, task notes 328 and via email 330. The action items then direct the user 310 (to whom the action items have been assigned) back to the comments/annotation when the document is opened with the CatchUp GlassViewer 304. While previous approaches only allow comments that do not affect the original document, the new approach in CatchUp allows executable commands to be included inside the comments and annotations while not changing the file content of the original document. CatchUp supports annotations and comments for PDF and Office format documents, but may be further included in all file types that may be used, including, but not limited to spreadsheets, presentations, and other similar files.

Each action item may be stored in an action record database on the database 322 as an action record. The action record may be created responsive to receiving the action item in the form of a request to create the action record. Each action record may comprise a link to at least one of a client record associated with a client to which the action is related, a matter record associated with a matter to which the action is associated, and a project record associated with a project to which the action is associated. Such link(s) may be included in the action record responsive to receiving at least one of a client, a matter, and a project in the action record request, defining a received client, a received matter, and a received project. The action record may further comprise the action to be performed, a link to a user record for the user that is assigned the action, a link to user record that created the action item, and an assignment date being the date the action record was created.

CatchUp supports both "user added" action items and "system added" action items. A user added action item is one that is added by a user and assigned to another user. A system added action item is one that is automatically added by the system when there is a resource allocation needed. There can be two types of users: human and non-human (machines, cars, MQTT brokers, for instance). Non-human users function like "virtual users" within the system. For example, a virtual user can be a CAT Scan machine which is assigned an action item to do a particular CAT scan task on a patient, and it updates it status of action item within the Kanban view and performs the task. Additionally, a cryptocurrency wallet may be charged for the cost of running the machine and an expense item is added and a budget is deducted.

Figure 4:
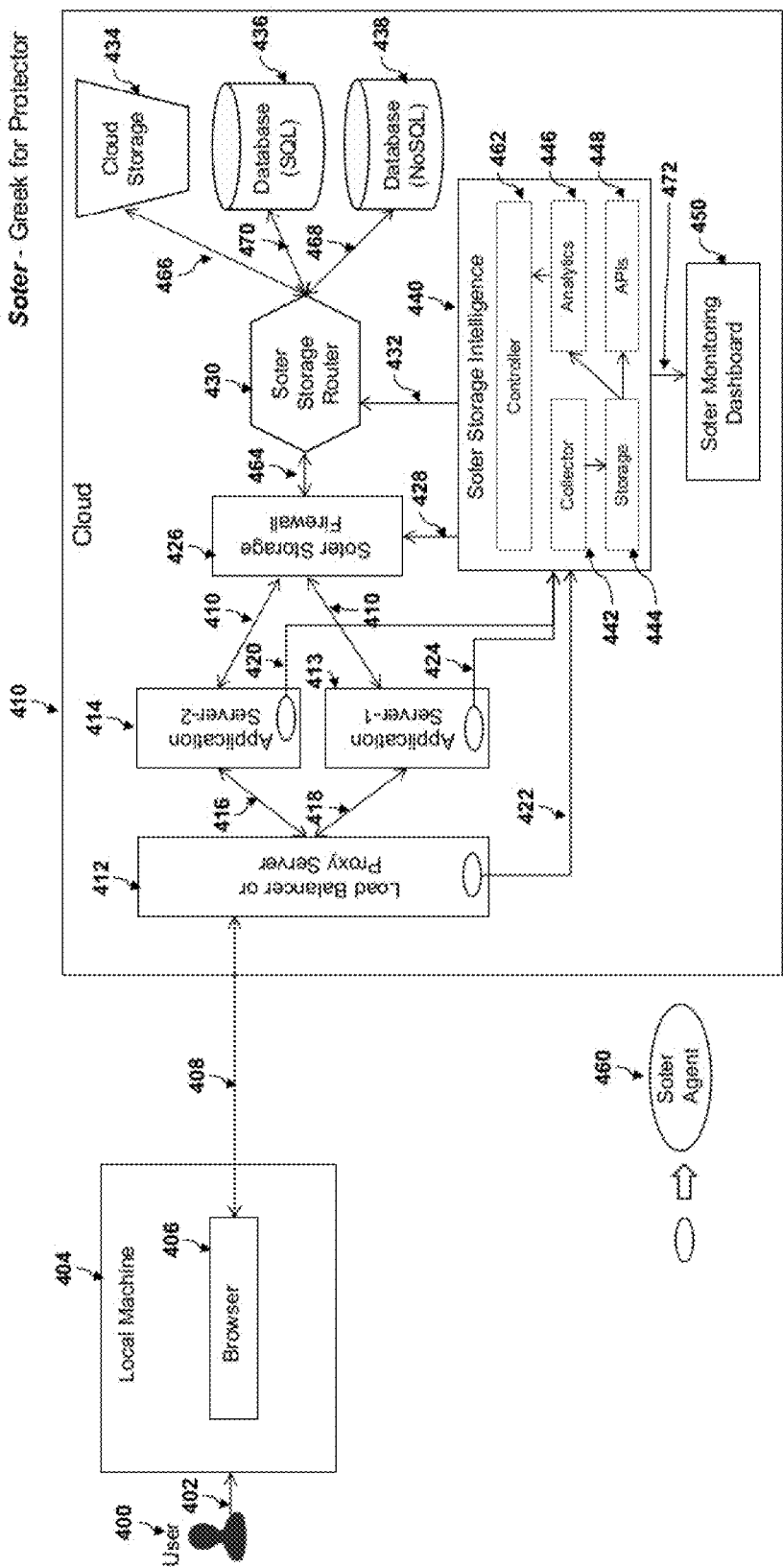
FIG. 4 is an illustration of the Soter Software Optimized Storage approach, according to an embodiment of the invention.

Referring now to FIG. 4, an illustration of the Soter Software Optimized Storage approach, is described in more detail. An Application, Insider or IoT device 400 accesses a web client running on the application servers 413, 414 in the cloud computing environment 410 using a browser 406 installed on a local machine 404. The requests are sent 408 from the browser 406 to the Load Balancer or Proxy Server 412 which forwards 416, 418 the requests to the application servers 413, 414. The application servers 413, 414 may forward 410 the requests to the Soter Storage Firewall 426 which allows or block requests in real-time based on the nature of the current request and previous requests. The Soter Storage Firewall 426 may be selectively included or excluded in the Soter architecture. The allowed requests are sent 464 to the Soter Storage Router 430 which identifies or inserts tags/headers that are associated with storage requests that allow it to choose between storage options such as (1) secure areas for storage of certain types of tagged data, or (2) faster locations for access, or (3) more fault-tolerant features. The Soter Storage Router 430 may route 466, 468, 470 the request to a data storage location, such as, for example, Cloud Storage 434, an SQL Database 436, or a NoSQL Database 438. In some embodiments, when data is returned from the data storage location to the local machine 404, it may not include/exclude location information about the data storage location, such as, but not limited to, an internet protocol (IP) address, a geographic location, or other identifying information about the data storage location. The Soter Agent 460 is deployed on every host or server including the load balancer or local proxy and the application servers. The agent 460 listens to the tracing data (including spans) which are injected in the instrumented client application and forwards 420, 422, 424 the traces to the Collector 442 in the Soter Storage Intelligence service 440. Agent 460 sends trace data asynchronously and outside the critical path to the Collector 442 over UDP. Agent 460 can insert these trace data in the implicit approach, if needed. The Collector 442 stores the trace information in trace storage 444, a cloud-based database. The Analytics component 446 analyzes the trace information of the requests in real-time. The Analytics component 446 may use various machine learning, deep learning and artificial intelligence (AI) models to generate rules for matching requests and adding new tags implicitly based on the data within a request. For example, the Analytics component 446 may use AI to identify credit card numbers from the requested application data accesses and tag them implicitly as "Secure". For the Analytics component 446, machine learning or deep learning models can be trained to identify malicious operations (such as bulk querying of sensitive database records). These models can then be used to generate new rules which are updated 428, 432 within the Soter Storage Firewall 426 or Soter Storage Router 430. The Controller component 462 updates the routing rules in the Soter Storage Router 430 and firewall rules in the Soter Storage Firewall 426 based on the analysis of requests and application's behavior at runtime, so that any inappropriate, unapproved or malicious transactions can be blocked. For example, if an application, insider or IoT device is trying to repeatedly query customer database and retrieve sensitive data, subsequent requests may be blocked. Soter Storage Intelligence service 440 may provide various APIs 448 for integration with other cloud services. The Soter Monitoring Dashboard 450 may access 472 the Soter Storage Intelligence service 440 and presents real-time monitoring information on requests, anomalous requests detected, threats identified and blocked.

Figure 5:
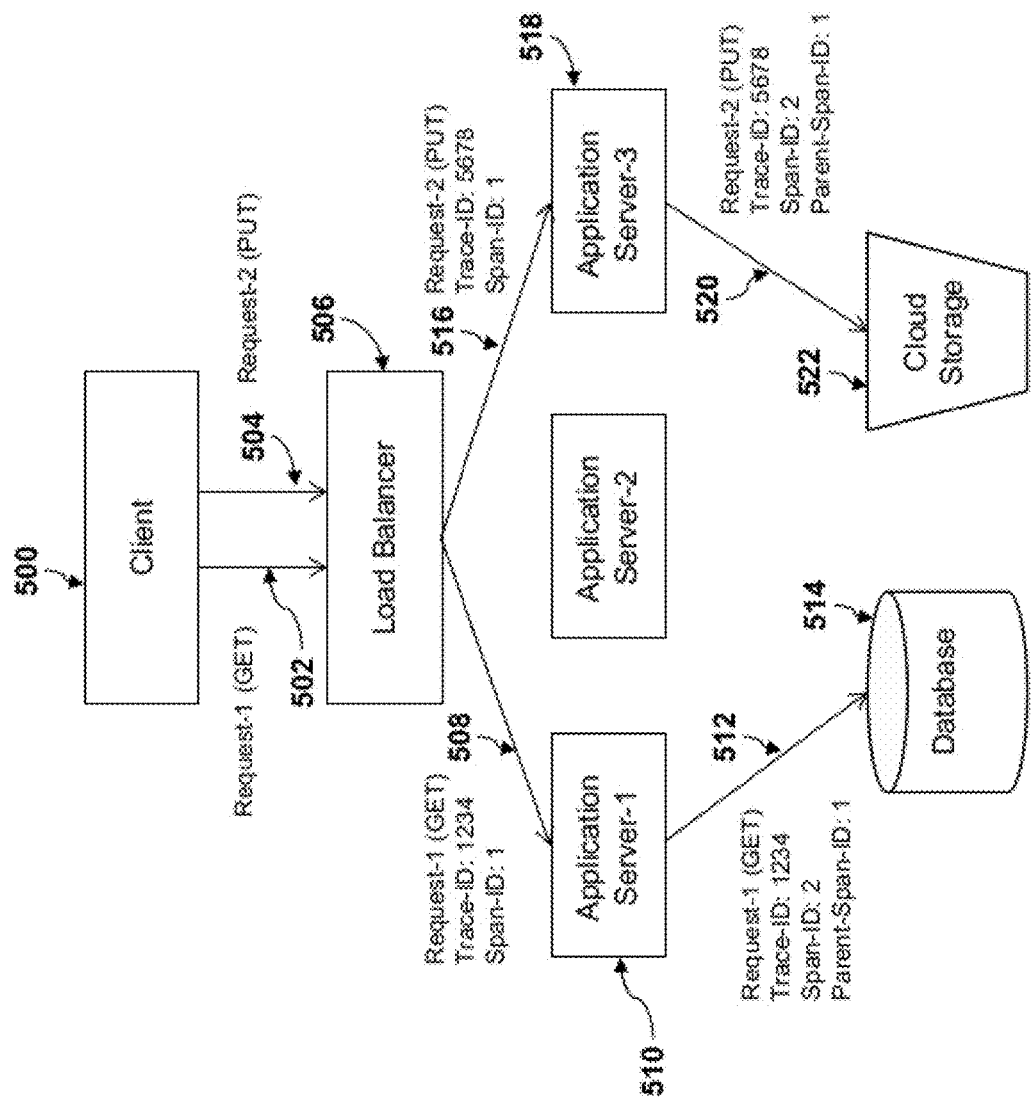
FIG. 5 is an illustration of tracing requests in the Soter Software Optimized Storage system, according to an embodiment of the invention.

Referring now to FIG. 5, an illustration of tracing requests in the Soter Software Optimized Storage system, is described in more detail. A client 500 sends an HTTP GET request 502 to retrieve records from a database. When the request reaches the load balancer 506, the Soter agent on the load balancer injects tracing information to the request. The tracing information may include the following:

a) Span: A span is a logical operation such as a method call or HTTP RESTful call. A span has a start and end time. Spans may define relationship to other spans (parent/child). Span is identified by a Span-ID.

b) Trace: Trace is a set of spans associated with the same request. Trace is identified by a Trace-ID. The Trace-ID remains the same as request propagates through various services.

c) Context/Meta-data: In addition to Trace and Span IDs, additional meta-data or context information related to the request may be propagated across spans. Meta-data related to speed, fault tolerance, security, traceability, chose storage allocation, and access based on application's requirements.

The optional load balancer 506 forwards 508 the GET request 502 to the application server-1 510. The application server-1 510 then sends 512 the request to the database 514. The same process is followed for the PUT request-2 504 sent 504 by the client 500 to put an object to a cloud storage. When the request reaches the load balancer 506, the Soter Agent on the load balancer injects tracing information to the request. The load balancer 506 forwards 516 the PUT request 504 to the application server-3 518. The application server-3 518 then sends 520 the request to the cloud storage 522. At each step, the tracing information is updated as a request propagates through multiple services emitting timing and other meta-data throughout.

Figure 6:
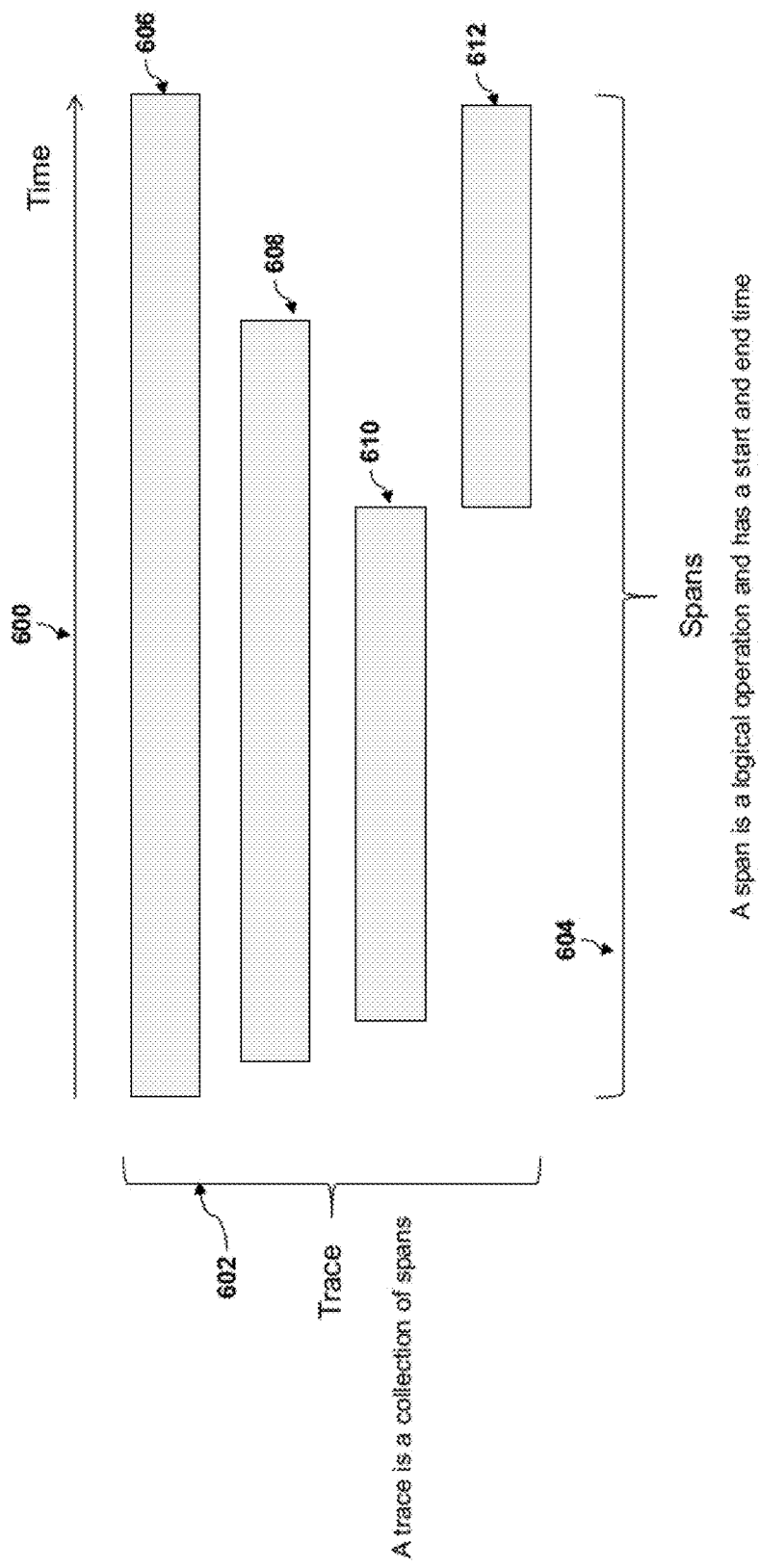
FIG. 6 is an illustration of a Trace and Span, according to an embodiment of the invention.

Referring now to FIG. 6, an illustration of a Trace and Span, according to an embodiment of the invention. A span is a logical operation and has a start and end time. A trace 602 is a collection of spans 606, 608, 610 and 612.

Figure 7:
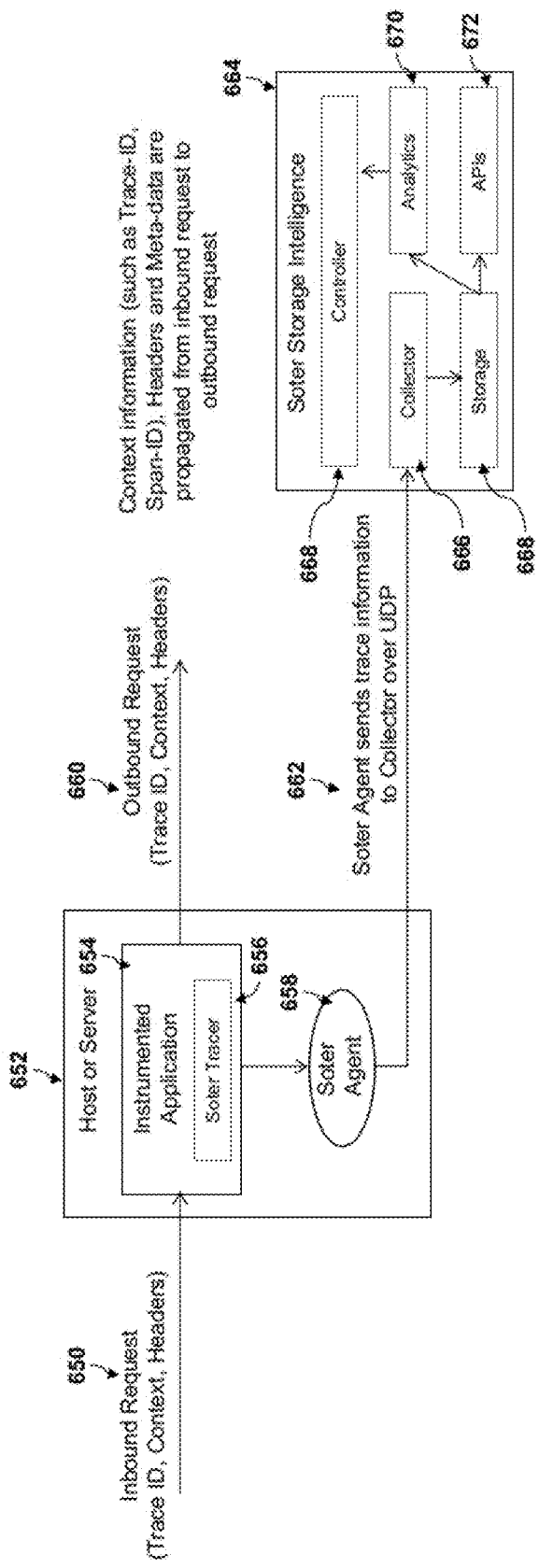
FIG. 7 is an illustration of an example of instrumenting an application and collecting traces, according to an embodiment of the invention.

Referring now to FIG. 7, an illustration of an example of instrumenting an application and collecting traces, is described in more detail. As an Inbound Request 650 arrives a host or server 652, the instrument application 654 running on the host or server 652 injects tracing information 656 to the request. The inbound request may already contain tracing information such as Trace ID, Context and Headers, which is propagated to the Outbound Request 660. The Soter Agent 658 installed on the host or server 652, sends 662 the trace information to the Collector 666 over UDP in the Soter Storage Intelligence Service 664. The Collector 666 stores the trace information in trace storage 668. The span context (including span ID, trace ID, tags) are propagated from the incoming request to outgoing request. All other tracing information (such as span operation name and span logs) are not propagated. Instead the sampled tracing information is transmitted out of process asynchronously, in the background, to Soter Agents.

Figure 8:
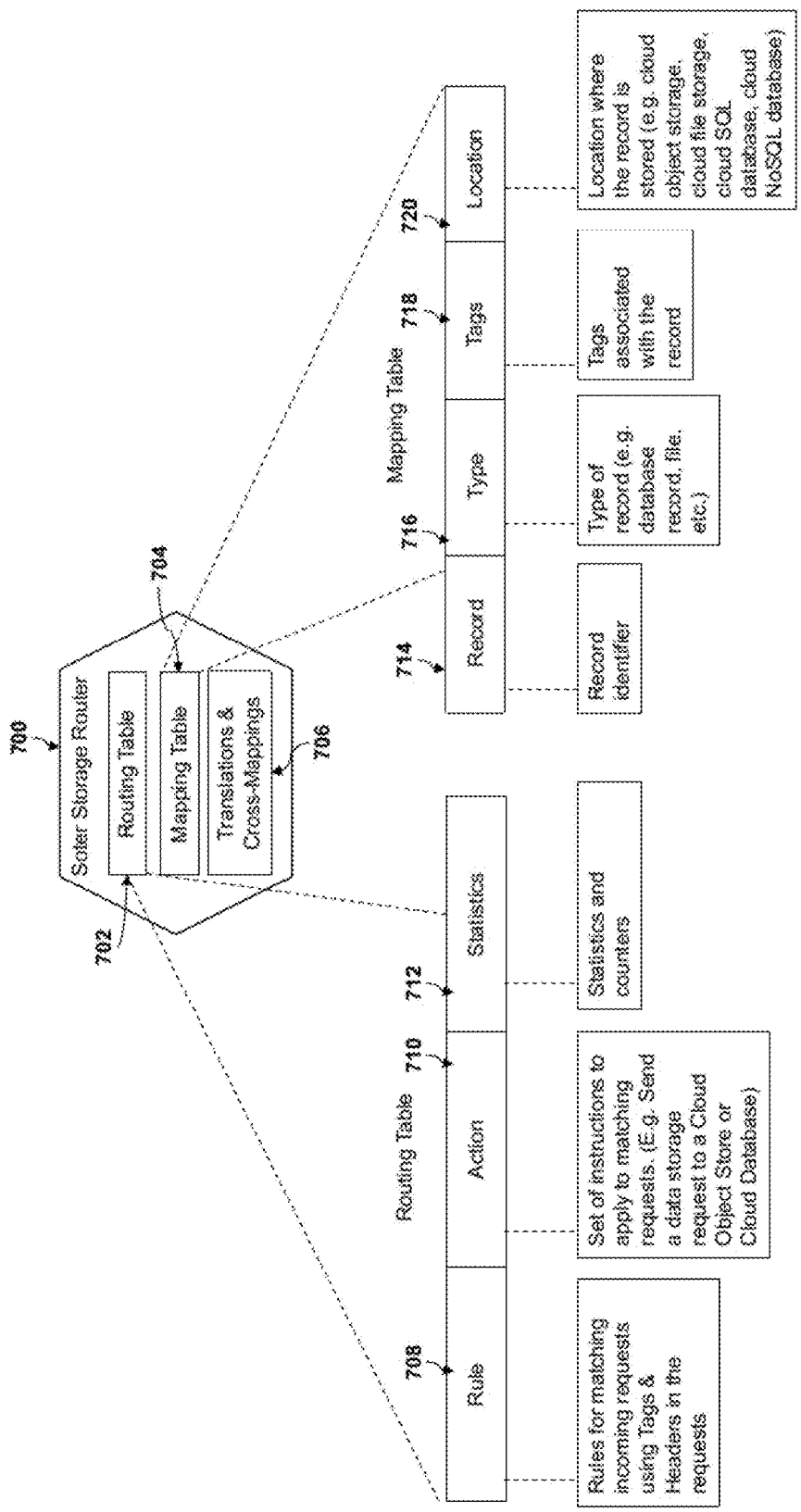
FIG. 8 is an illustration of a routing table within the Soter Storage Router, according to an embodiment of the invention.

Referring now to FIG. 8, an illustration of a routing table within the Soter Storage Router, is described in more detail. A routing table 702 within a Soter Storage Router 700 comprises Rules 708, Actions 710 and Statistics 712. Rules 708 are used for matching incoming requests based on the tags and headers in the requests. Actions 710 define the set of instructions to apply to matching requests. For example, send a data storage request tagged as "Fast" to a Cloud NoSQL Database and a data storage request tagged as "Cold" to a Cloud Object Storage. A routing table 702 may maintain various statistics and counters 712 such as number of requests matched, number of requests with a specific tag and so on. The Soter Router 700 maintains a mapping table 704 which contains the mappings of records to the storage targets/locations 720 managed by a Soter system. This mapping table can be implemented in many ways, as known to one of ordinary skill in the art, including but not limited to a distributed hash table, or a list, or a lookup table, that may be also be replicated at origin servers or edge servers within a content delivery network (CDN) such as those offered by Akamai (https://www.akamai.com/us/en/cdn/). When an application sends requests to store, create, or modify a data record/object the Soter Storage Router 700 may assign the record/object 714 to a storage target (such as cloud object storage, cloud file storage, cloud SQL database or cloud NoSQL database) based on the tags 718 and headers attached to the application data request and the type 716 of application data. The Soter Storage Router 700 maintains mappings of records 714 to storage locations 720 in a cloud-based mapping database. These mappings are used when the application sends requests for querying specific data records/objects using typical structures, such as a Distributed Hash Table, as known to practitioners in the related arts. The Soter Storage Router 700 can scramble the mappings and store them in an encrypted form to make it secure from snooping. The Soter Storage Router 700 may maintain default mappings for certain types of requests. For example, all SQL requests to store or update data records can be mapped to the SQL database being managed by the Soter system. The Soter Storage Router 700 also contains Translations and Cross-Mappings 706 for translating requests from one format to another (such as SQL to NoSQL). For example, translation of an SQL request to insert a data record in an SQL database to a NoSQL database specific request.

Figure 9:
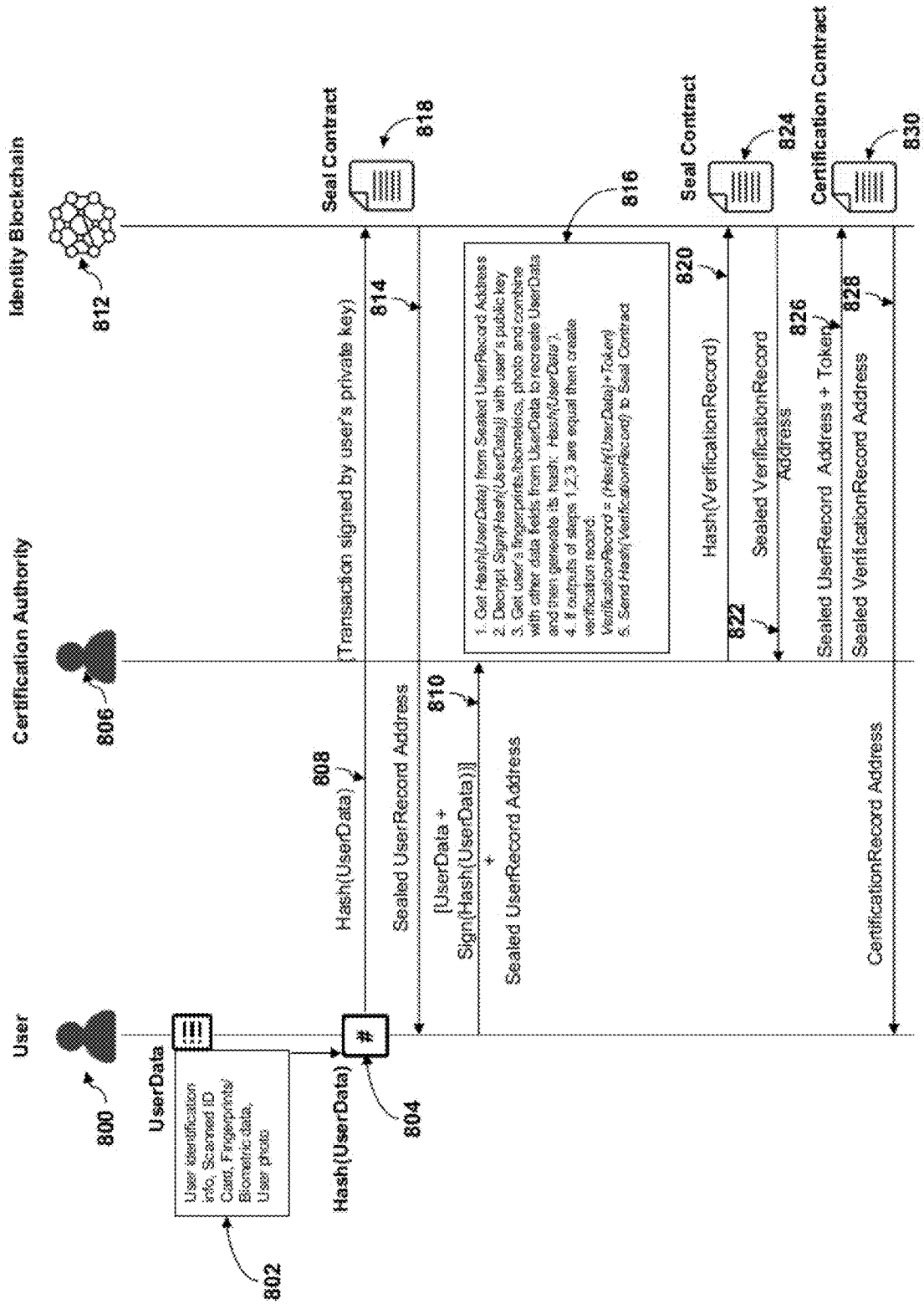
FIG. 9 is an illustration of the user registration and certification process, according to an embodiment of the invention.

Referring to FIG. 9, the user registration and certification process, for securely linking blockchain accounts to real users, is described in more detail. User registration process is done to link a real user 800 to one or more blockchain accounts. For the registration process, the user 800 either uses a registration application either on mobile or a desktop computer. In the registration application, the user provides the identification information (including fields such as name, address, date of birth and other identification information), scanned identification card (such as a driver license, passport or other types of ID cards), fingerprints and other biometric data, user photo, and any other type of data that can be used to identify the user. Each data field provided by the user in the registration application (collectively referred to as the 'UserData' 802) is hashed using a one-way hash function 804, generating hashed data 808. The registration application then creates a new smart contract from this hashed data 808, which is referred to as the 'Seal Contract' 818. The transaction to create this new Seal Contract 818 on the blockchain network is signed by the user's private key. The Seal Contract 818 maintains a record of the hashed user data and the user's address on the blockchain network. A separate private and/or permissioned blockchain 812 may be used for user identity management, where the Seal Contract is deployed. When the transaction to create the new Seal Contract is mined, the user gets an address of the contract, which is referred to as the 'Sealed UserRecord Address' 814. This completes the user registration process.

The next step is the certification process, in which the user provides the 'UserData', digitally signed and hashed 'UserData', and the 'Sealed UserRecord Address' 814 to a certification authority 806. The data is signed by the user's private key. This data may be shared with the certification authority 806 over an encrypted and secure channel, so that only the certification authority can decrypt and access the data. The certification authority 806 then verifies if the UserRecord has been created and sealed by the user 800 and if the user own's the record and the associated Seal Contract 818 by performing a certification process 816. The steps involved in the certification process 816 may include, as follows:

1. Get Hash(UserData) from Sealed UserRecord Address
2. Decrypt Sign(Hash(UserData)) with user's public key
3. Get user's fingerprints and/or biometric data, user photo and combine with other data fields from UserData to recreate UserData and then generate its hash: Hash(UserData').
4. If outputs of steps 1, 2, 3 above are equal then create verification record as follows: Verification Record=(Hash(UserData)+Token)
5. Create a new Seal Contract with Hash(VerificationRecord) 820 as the input data.

The transaction to create this new Seal Contract 824 on the blockchain is signed by the certification authority's private key. When the transaction to create the new Seal Contract 824 is mined, the certification authority 806 gets an address of the contract, which is referred to as the 'Sealed VerificationRecord Address' 822.

Next the certification authority creates a new smart contract, referred to as the 'Certification Contract' 830 by providing the Sealed UserRecord Address 814, Certification Token and Sealed VerificationRecord Address 822 as the input data 826 to the contract. When the transaction to create the Certification Contract 830 is mined, the certification authority gets an address of the contract, which is referred to as the 'Certification Record Address' 828, and shares this address with the user. This completes the user certification process. The certification process establishes the ownership of the blockchain account (and its associated public-private key-pairs) to a real user 800 whose identity is verified by the certification authority 806. The certification token can be used to set a validity or a timeout period for a key-pair. After the timeout of the certification of key-pair, the certification process has to be done again. This certification renewal process adds additional security and prevents against any misuse of keys.

Figure 10:
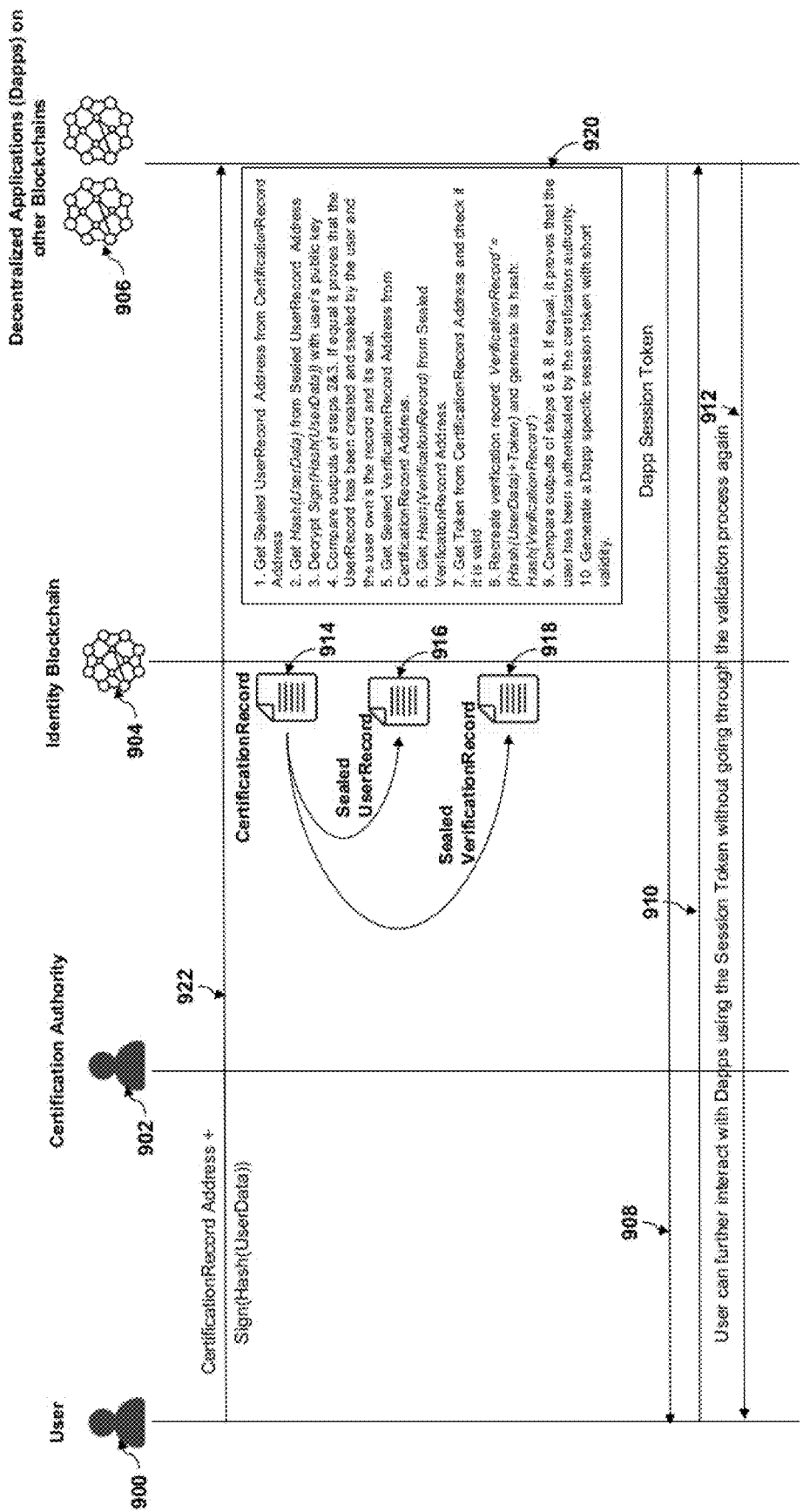
FIG. 10 is an illustration of the user validation process, according to an embodiment of the invention.

Referring to FIG. 10, a method aspect of the present invention for user validation is described in more detail. A certified user 900 can then interact with blockchain applications (either smart contracts or decentralized applications). These blockchain applications may be deployed on different blockchain networks 906. When a blockchain application requests the identity of a certified user 900, the user sends the CertificationRecord Address and the signed and hashed UserData 922 to the blockchain application. The blockchain application then carries out the validation process 920. The steps involved in the validation process 308 may include, as follows:

1. Get Sealed UserRecord Address 916 from CertificationRecord Address 914
2. Get Hash(UserData) from Sealed UserRecord Address 916
3. Decrypt Sign(Hash(UserData)) with user's public key
4. Compare outputs of steps 2 and 3. If equal it proves that the UserRecord has been created and sealed by the user and the user own's the record and its seal.
5. Get Sealed VerificationRecord Address 918 from CertificationRecord Address
6. Get Hash(VerificationRecord) from Sealed VerificationRecord Address 918
7. Get Token from CertificationRecord Address and check if it is valid
8. Recreate verification record: VerificationRecord'=(Hash(UserData)+Token) and generate its hash: Hash(VerificationRecord')
9. Compare outputs of steps 6 and 8. If equal, it proves that the user has been authenticated by the certification authority.

The above steps complete the user validation process 920. Once a user has been validated, the blockchain application may generate an application specific session token 908 (with a short validity), so that the user can interact 910, 912 further with the application without going through the validation process again for each transaction.

Figure 11:
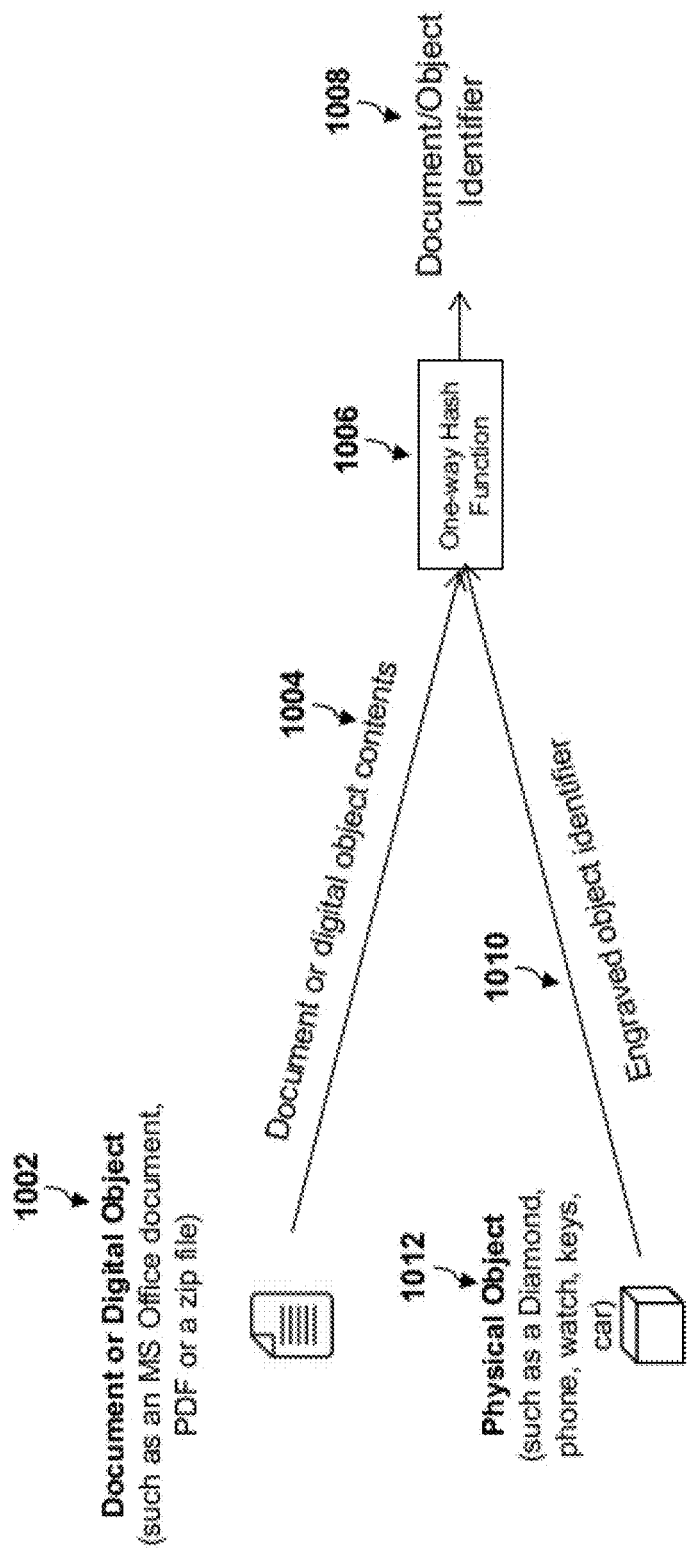
FIG. 11 is an illustration of the process to generate a unique document or object identifier, according to an embodiment of the invention.

Referring to FIG. 11, a method for generating a unique document or object identifier, according to an embodiment of the present invention is now described in detail. For a document or digital object 1002 (such as a word processing document, such as a Microsoft Office Word document, PDF or a zip file), the contents 1004 of the document or object are input to a cryptographic hash function 1006 (such as SHA-3, although all other cryptographic hash functions as are known in the art are contemplated and included within the scope of the invention) to generate a unique identifier 1008. The identifier 1008 for a document of digital object is specific to the contents of the document or object and any change in the document or object contents changes the cryptographic hash. For a physical object 1012 (such as a diamond, phone, car, watch, keys) an object identifier (such as a laser inscription in a diamond, phone IMEI number, car engine or chassis number, an engraved number on a key) associated with the physical object 1012 is input to the cryptographic hash function 1006 to generate the unique identifier 1008.

Figure 12:
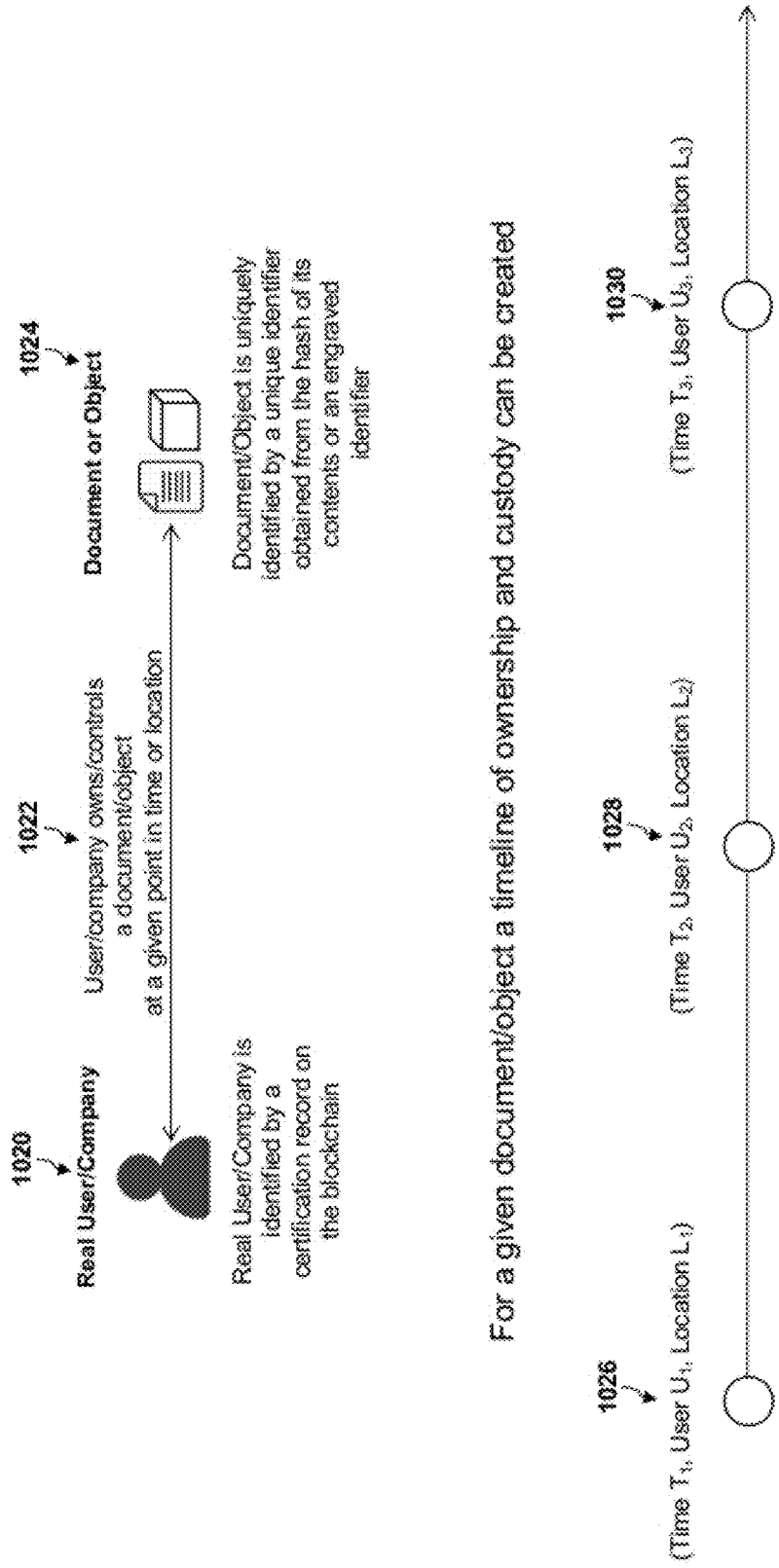
FIG. 12 is an illustration of the timeline of ownership and custody of a document or object, according to an embodiment of the invention.

Referring to FIG. 12, a timeline of ownership and custody of a document or object, according to an embodiment of the present invention is described in more detail. A document or object 1024 is owned or controlled by a user or company 1020 at a given point in time or location. By recording the ownership and custody of the document or object along with the timestamp and/or location, a timeline can be created such that points 1026, 1028, 1030 on the timeline establish the ownership and custody of the document or object.

An embodiment of the invention provides a system and associated methods for issuing blockchain-based digital certificates which serve as combined Proofs of Existence, Ownership, Custody and Integrity of documents or objects (digital or physical), defined as a combination certificate.

Figure 13:
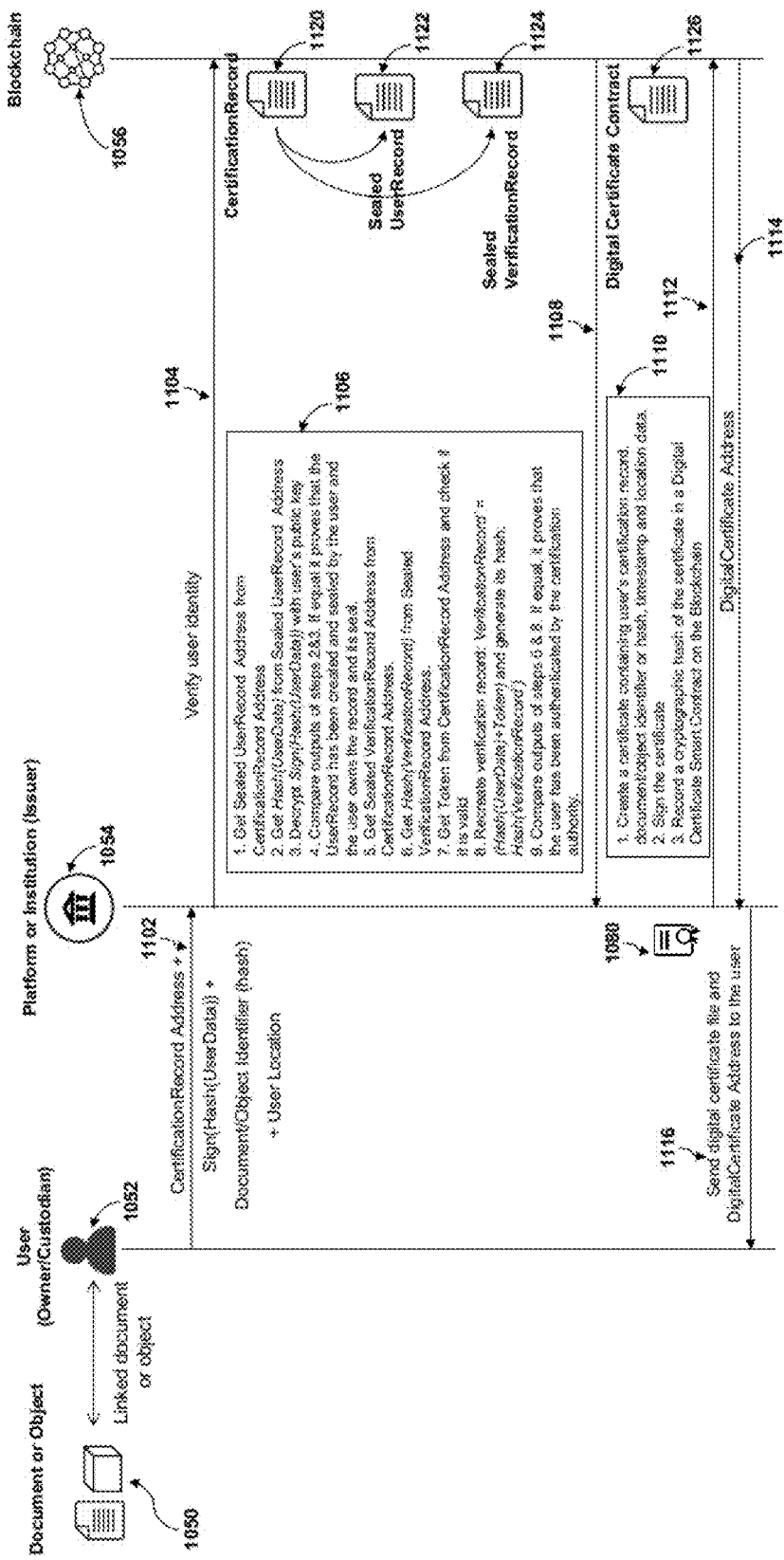
FIG. 13 is an illustration of the certificate generation process, according to an embodiment of the invention.

Referring to FIG. 13, the process for issuing a combination certificate for proof of existence, ownership, custody and integrity, according to an embodiment of the present invention is described in more detail. A certified user 1052 who is the owner or custodian of a document or object 1050, sends the user's CertificationRecord address, digitally signed and hashed 'UserData', hash of the document contents or object identifier, and user location to the issuer 1054 in step 1102. The issuer 1054 then verifies the user identity in step 1104 by performing a user validation process 1106. The steps involved in the user validation process 1106 may include, as follows:

1. Get Sealed UserRecord Address 1122 from CertificationRecord Address 1120
2. Get Hash(UserData) from Sealed UserRecord Address 1122
3. Decrypt Sign(Hash(UserData)) with user's public key
4. Compare outputs of steps 2 and 3. If at least a partial match it proves that the UserRecord has been created and sealed by the user and the user own's the record and its seal.
5. Get Sealed VerificationRecord Address 1124 from CertificationRecord Address 1120
6. Get Hash(VerificationRecord) from Sealed VerificationRecord Address 1124
7. Get Token from CertificationRecord Address and check if it is valid
8. Recreate verification record: VerificationRecord'= (Hash(UserData)+Token) and generate its hash: Hash(VerificationRecord')
9. Compare outputs of steps 6 and 8. If at least a partial match, it proves that the user has been authenticated by the certification authority.

In the comparisons performed at steps 4 and 9, at least a partial match is required. The partial match may be based on satisfying one or more criteria, including, but not limited to, matching of a subset of fields in a record, longest prefix match, longest sub-string match or fields in the record satisfying a range query. In some embodiments, all the criteria must be satisfied for the comparison to be deemed successful and demonstrating, in the case of step 4, that the UserRecord has been created and sealed by the user and the user own's the record and its seal and, in the case of step 9, that the user has been authenticated by the certification authority.

The above steps complete the user validation process 1106. Next, the combination certificate is created at 1110 as follows:

1. Create a combination certificate containing user's certification record, document/object identifier or hash, timestamp and, optionally, location data.
2. Sign the combination certificate digitally
3. Record a cryptographic hash of the combination certificate in a Digital Certificate Smart Contract 1126 on the blockchain network 1056.

The issuer 1054 may receive a DigitalCertificate Address of the Digital Certificate Smart Contract 1126 on the blockchain network 1056 at step 1114. The issuer 1054 then sends the combination certificate 1080 containing the DigitalCertificate Address and other certificate details to the user 1052 in step 1116.

It is contemplated and included within the scope of the invention that embodiments of the invention may be operable to interact with a blockchain network 1056 as presented herein, including, but not limited to, proof-of-work systems, proof-of-stake systems, and hybrid systems that are a combination of proof-of-work and proof-of-stake systems. Furthermore, it is contemplated and included within the scope of the invention that the invention may be operable to interact with a public ledger system other than a blockchain network.

Figure 14:
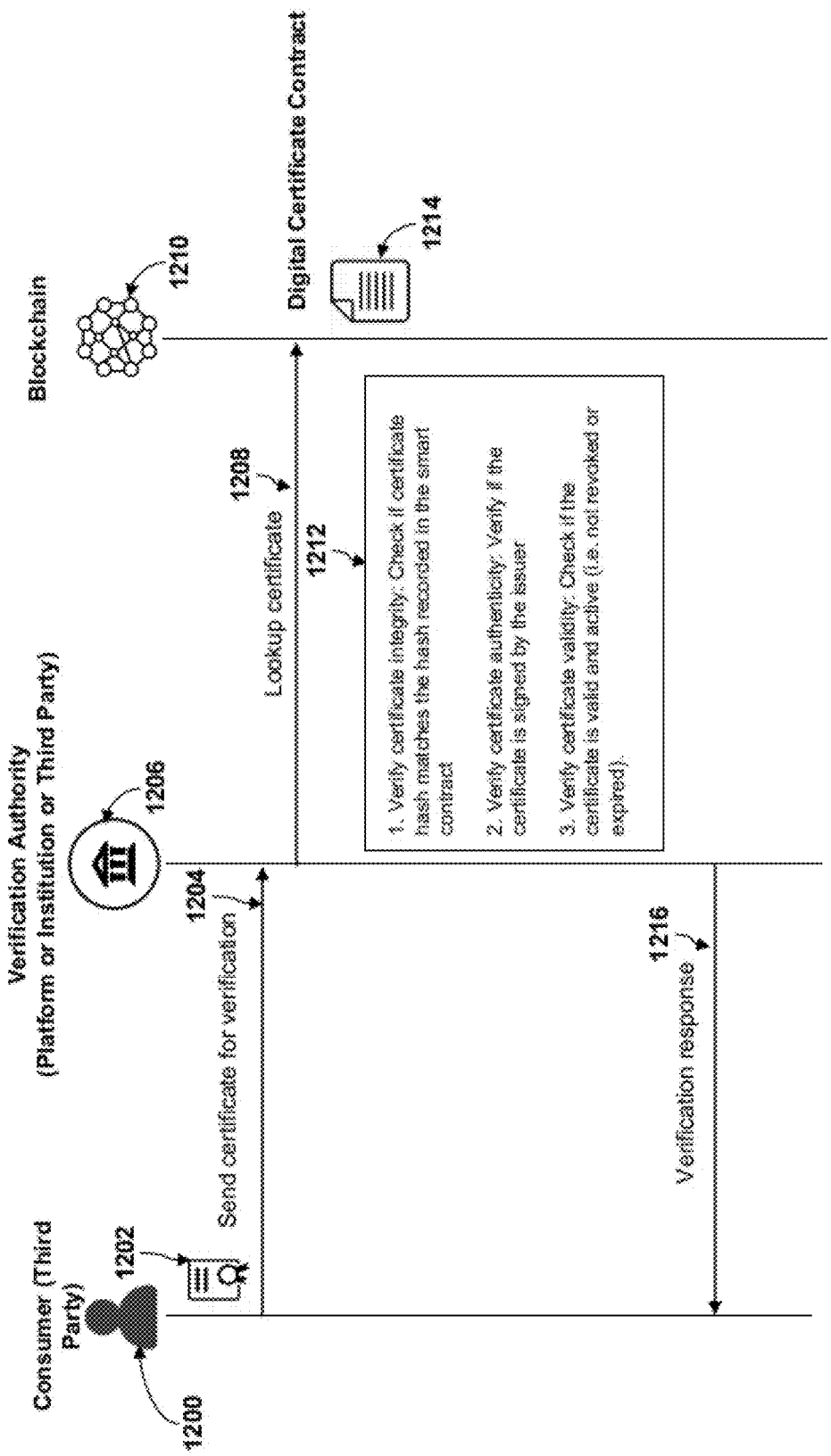
FIG. 14 is an illustration of the process for issuing a certificate for proof of existence, ownership, custody and integrity, according to an embodiment of the invention.

Referring to FIG. 14, the certificate verification process for a document or object, according to an embodiment of the present invention is described in more detail. The consumer or third party 1200 can verify a combination certificate 1202 with a verification authority 1206. The consumer or third party 1200 sends the combination certificate 1202 to the verification authority 1206 in step 1204. A mobile or web application may be used in the certificate verification process where a user can submit the combination certificate in the mobile or web application for verification. The verification authority 1206 looks up the combination certificate 1202 on the blockchain network 1210 in step 1208 and then verifies the combination certificate 1202 at 1212 as follows:

1. Verify combination certificate integrity: Check if the combination certificate hash matches the hash recorded in the smart contract.
2. Verify combination certificate authenticity: Verify if the combination certificate is signed by the issuer.
3. Verify combination certificate validity: Check if the combination certificate is valid and active (i.e. not revoked or expired).

Once the combination certificate 1202 is verified, the verification authority 1206 sends a verification response 1216 to the consumer or third party 1058.

Figure 15:
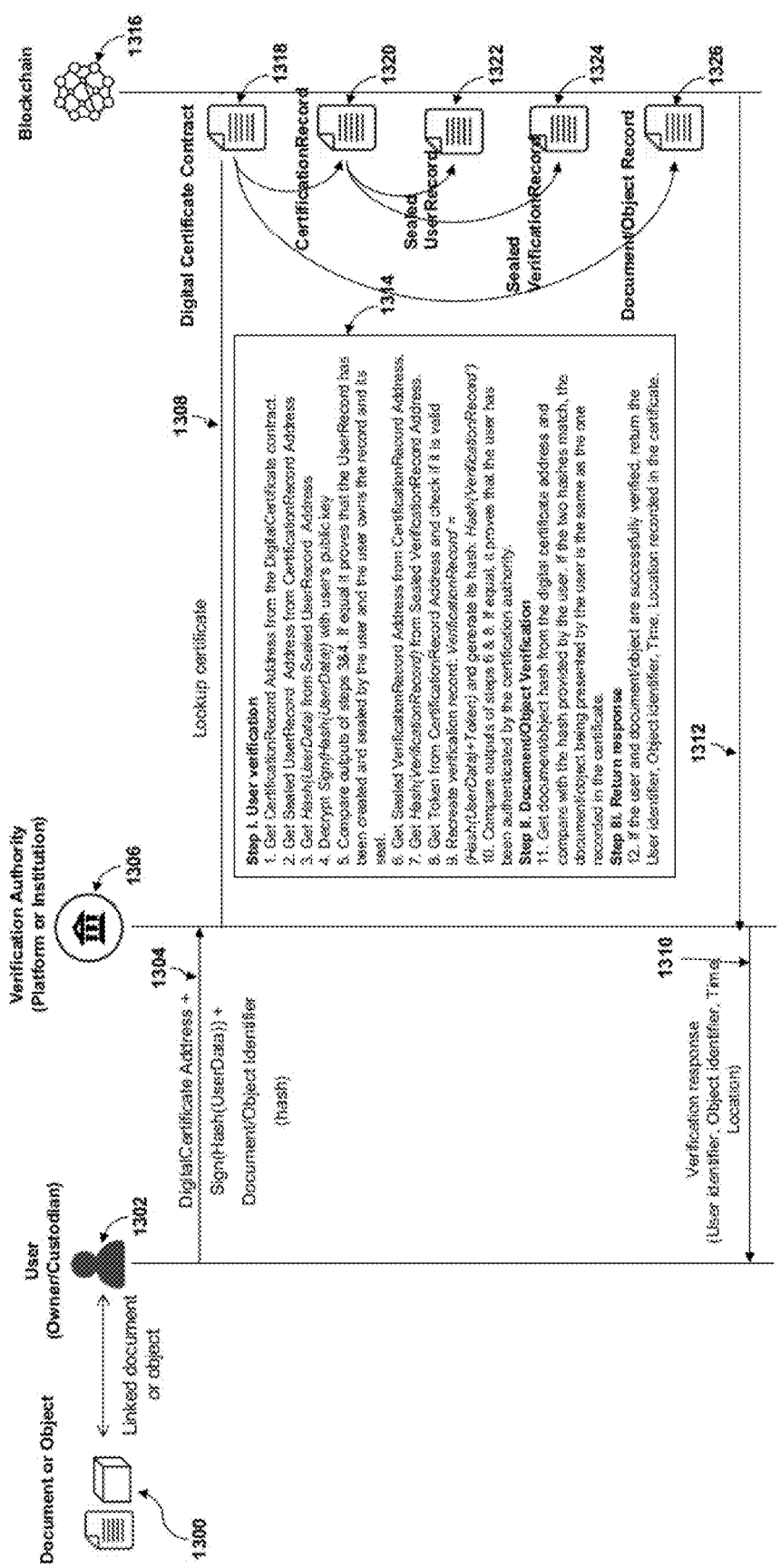
FIG. 15 is an illustration of the certificate verification process, according to an embodiment of the invention.

Referring to FIG. 15, the process for verifying or proving existence, ownership, custody and integrity of a document or object, according to an embodiment of the present invention is described in more detail. A user 1302 who is the owner or custodian of a document or object 1300, can prove the existence, ownership, custody and integrity of a document or object, by sharing the DigitalCertificate Address, digitally signed and hashed 'UserData', and the document/object identifier (hash of the document contents or the object identifier) with the verification authority 1306. The verification authority 1306 then looks up the certificate on the blockchain network 1316 and verifies the user identity and existence, ownership, custody and integrity of the document or object 1300 at 1314 as follows:

1. Get CertificationRecord Address 1320 from the DigitalCertificate Address 1318
2. Get Sealed UserRecord Address 1322 from CertificationRecord Address 1320
3. Get Hash(UserData) from Sealed UserRecord Address 1322
4. Decrypt Sign(Hash(UserData)) with user's public key
5. Compare outputs of steps 3 and 4. If at least a partial match it proves that the UserRecord has been created and sealed by the user and the user own's the record and its seal.
6. Get Sealed VerificationRecord Address 1324 from CertificationRecord Address 1320
7. Get Hash(VerificationRecord) from Sealed VerificationRecord Address 1324
8. Get Token from CertificationRecord Address and check if it is valid
9. Recreate verification record: VerificationRecord'= (Hash(UserData)+Token) and generate its hash: Hash(VerificationRecord')
10. Compare outputs of steps 7 and 9. If at least a partial match, it proves that the user has been authenticated by the certification authority.
11. Get document/object hash from the DigitalCertificate contract 1326 and compare with the hash provided by the user. If the two hashes match at least partially, the document/object being presented by the user is the same as the one recorded in the certificate.

12. If the user and document/object are successfully verified, return the User identifier, Object identifier, Time, Location recorded in the combination certificate 1326.

FIG. 16 is an illustration of an example of a combined proof of ownership, existence, custody and integrity certificate, according to an embodiment of the invention. The digital certificate 1400 includes a certificate identifier 1402, a certificate URL 1404 (which is specific to the issuer or the platform issuing the certificate), the document or object name 1406, the document or object identifier 1408, the name of the owner or custodian 1410 of the document or object, the user (owner or custodian) identifier 1412, date and time of generation of the certificate 1414 and location of the user when the certificate was issued 1416.

Figure 17:
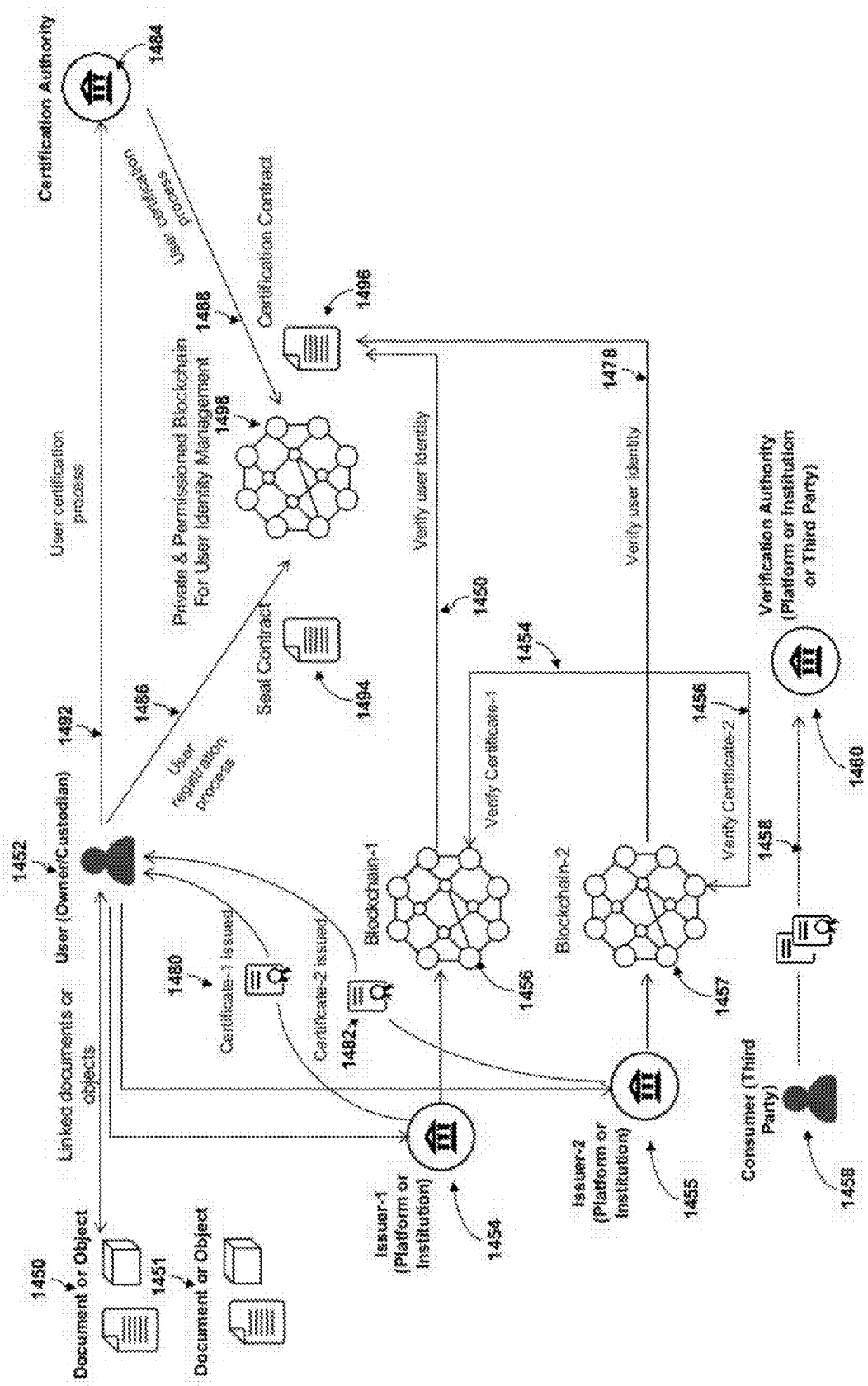
FIG. 17 is an illustration of the process for issuing and verifying certificates for multiple documents or objects on multiple blockchains linked to the same user, according to an embodiment of the invention.

Referring to FIG. 17, the process for issuing and verifying certificates for multiple documents or objects on multiple blockchains linked to the same user, according to an embodiment of the present invention is described in more detail. The user registration process 1486 needs to be done only once for a user 1452, generating a seal contract 1494. Similarly, the certification process 1488 is done once for the user generating a certification contract 1496. The seal and certification contracts 1494, 1496 are deployed on a blockchain network 1498. The user 1452 is the owner or custodian of a documents or objects 1450 and 1451 for which combination certificates 1480 and 1482, as described above, are issued by separate issuers 1454 and 1455 on separate blockchain networks 1456 and 1457 respectively. While issuing the certificate for documents/objects 1450 and 1451, the respective issuers 1454 and 1455 verify the user identity from the certification contract 1496 deployed on the blockchain network 1498. The user 1452 can maintain the same identity across multiple blockchain networks (such as 1456 and 1457) for getting the digital certificates for multiple documents/objects (such as 1450 and 1451) without going through the user registration and certification process again. The user 1452 can share the combination certificates 1480 and 1482 with a consumer or third party 1458. The consumer or third party 1458 can get the combination certificates 1480 and 1482 verified from the verification authority 1460. To verify a certificate, the verification authority looks up the certificate on the corresponding blockchain network and then performs the verification steps described hereinabove.

Figure 18:
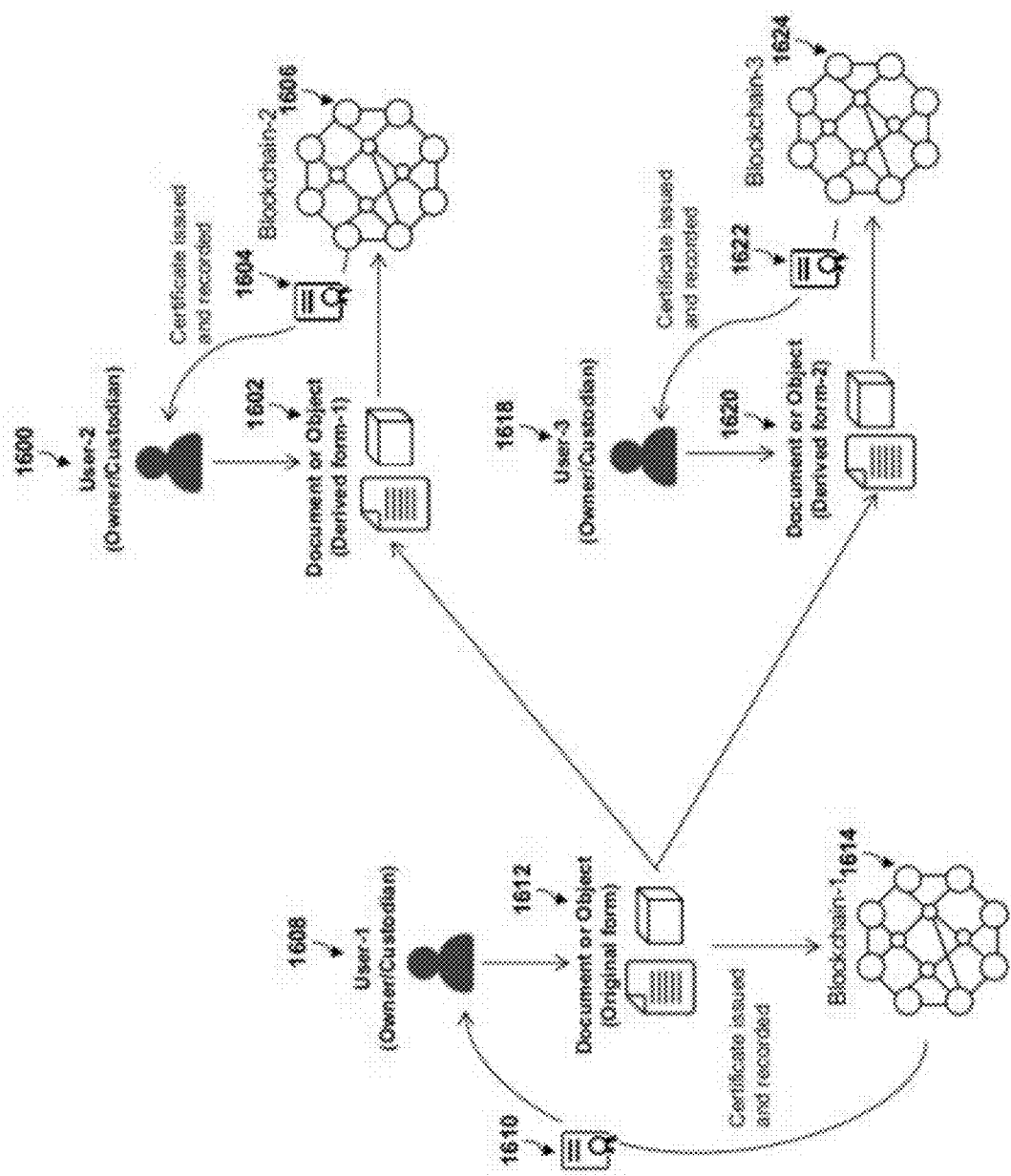
FIG. 18 is an illustration a sequential model of document/object existence where the derived forms of a document/object are recorded on multiple blockchains, according to an embodiment of the invention.

FIG. 18 is an illustration of a sequential model of document/object existence where the derived forms of a document/object are recorded on multiple blockchains, according to an embodiment of the invention. A document or object 1708 can be processed, edited or modified to create multiple derived objects 1712 and 1716 which exist sequentially. The combined existence, ownership, custody and integrity of a document or object 1708 is recorded in a combination certificate 1706 on a blockchain network 1718 and owned by a first user 1700. Similarly, the derived objects can be processed/recorded as subsequent second and third combination certificates 1710, 1714 in a successive sequence of second and third blockchain networks 1720 and 1722, sequentially, and owned by successive second and third users 1702, 1704, respectively. In the sequential case, the document/object gets transformed into another document/object and recorded on the next blockchain but is not present in the previous one. The sequential model is a lifetime trajectory where an object can pass through (or get recorded in) multiple blockchains but is active in only one, and leaves a trail. A timeline of existence, ownership, custody and integrity 1726 can be established for an object 1708 where each point in the timeline 1724, 1728, 1730 corresponds to the original or derived forms of a document/object and is associated with each of the first, second, and third blockchain networks 1718, 1720, 1722 as well as the first, second, and third users 1700, 1702, 1704.

Figure 19:
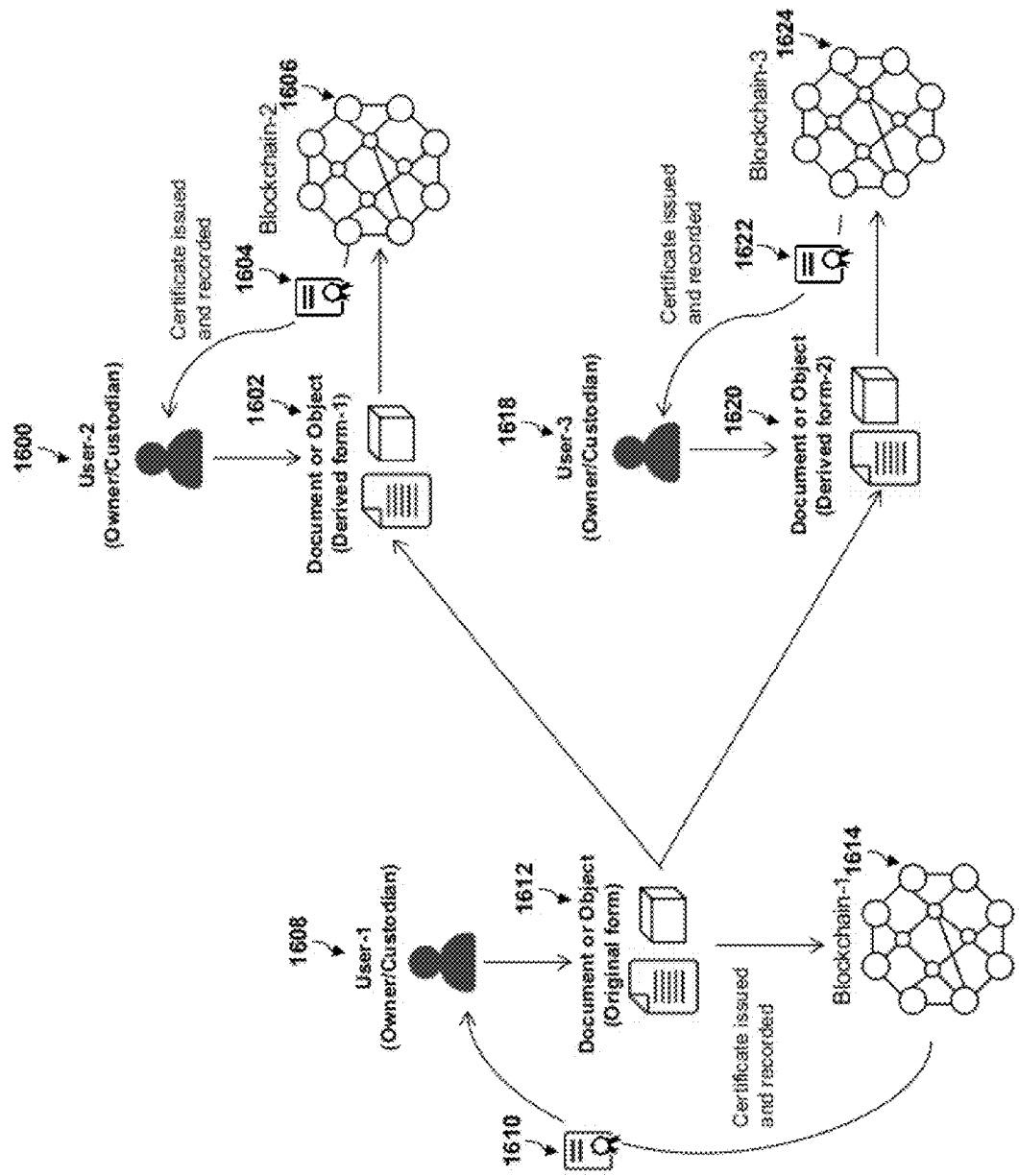
FIG. 19 is an illustration a concurrent model of document/object existence where the derived forms of a document/object are recorded on multiple blockchains, according to an embodiment of the invention.

FIG. 19 is an illustration of a concurrent model of document/object existence where the derived forms of a document/object are recorded on multiple blockchains, according to an embodiment of the invention. A document or object 1612 can be processed, edited or modified to create multiple derived objects 1602 and 1620 which exist concurrently (as in prescription and retail and payment blockchains). The combined existence, ownership, custody and integrity of a document or object 1612 is recorded in a combination certificate 1610 on a blockchain network 1614 and owned by a first user 1608. Similarly, the derived objects can be processed/recorded in second and third combination certificates 1604, 1622 in a successive sequence of blockchain networks 1606, 1624, concurrently, and owned by second and third users 1600, 1618, respectively. In the concurrent model the document/object can exist in derived forms in multiple chains.

Figure 20:
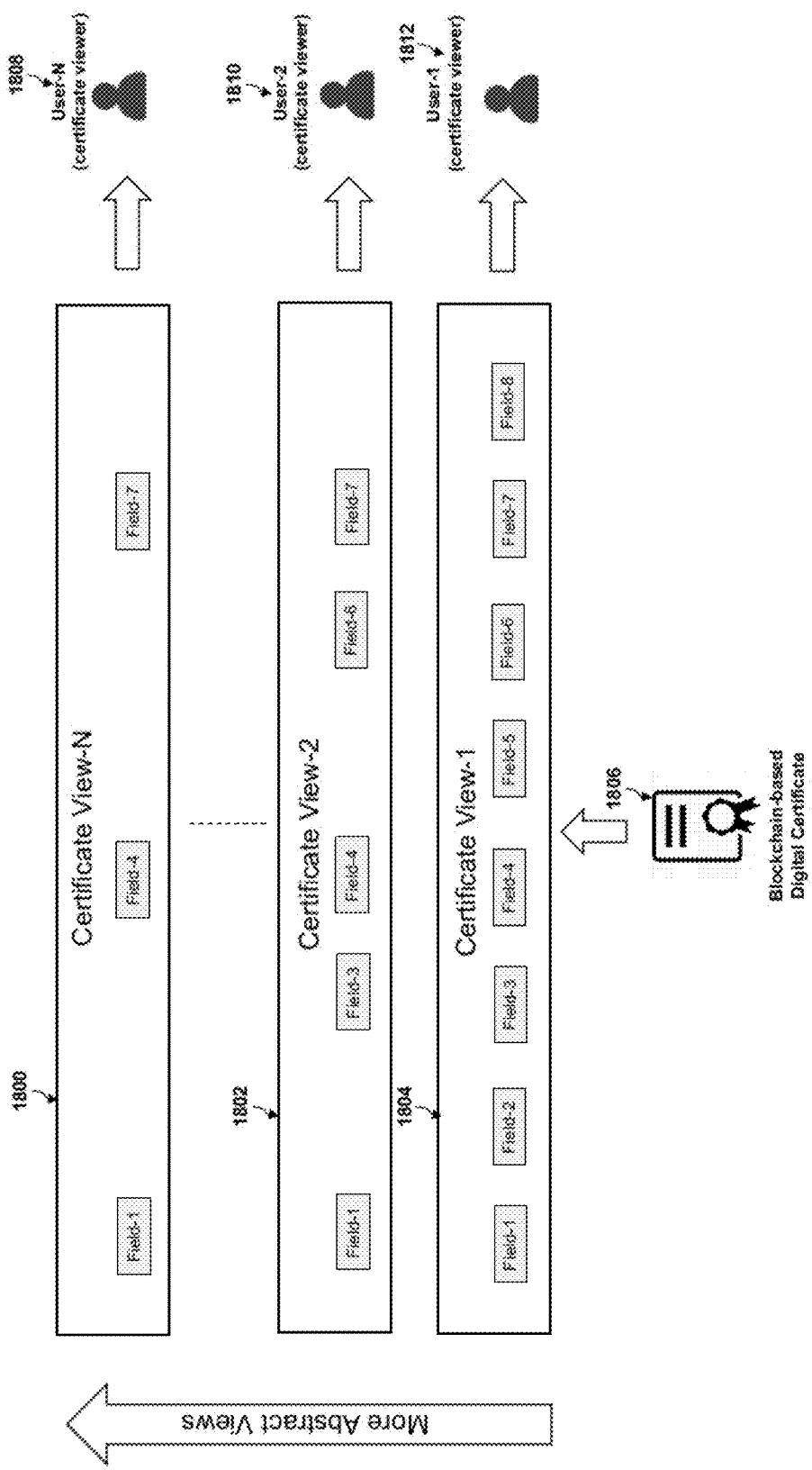
FIG. 20 is an illustration of levels of abstraction for a combined proof of ownership, existence, custody and integrity certificate, according to an embodiment of the invention.

Referring to FIG. 20, levels of abstraction for a combined proof of ownership, existence, custody and integrity certificate, according to an embodiment of the invention, are described in more detail. A combination certificate may take many forms when generated for different purposes or views (such as full, partial or redacted) depending on privacy and security constraints. A combination certificate record 1806 may have multiple levels of abstraction and detail depending on how and who is viewing or verifying it. For example, in the case of a combination certificate that represents the academic credentials of a student, a potential employer can see some details on the GPA of a graduate student but not how long it took to graduate, whereas, a graduate school could see the reference letters or list of courses and individual grades. Similarly, in the case of a combination certificate that represents the ownership and transfer record of a house, one level of detail can be shown to a buyer and another level of detail can be shown to a lender. In the least abstract form, a certificate view 1804 may make all the combination certificate fields visible to a user 1812. Whereas in the most abstract form 1800, only a subset of fields in the combination certificate may be visible to the user 1808. Furthermore, an intermediate abstract form 1802 may include a subset of fields that varies in scope in terms of the quantity and content of the fields presented by either the most abstract form 1800 and the certificate view 1804. A combination certificate could provide links to other certificates with further related information and access roles and permissions required to access those links. A combination certificate may also contain a chain of custody and a timeline. In some embodiments, a consumer or third party can verify an intermediate abstract form of a combination certificate 1806 with a verification authority. In such a case the consumer can send a loose query (for example, "has the student graduated before 2004?", "is a student's GPA above 3.0?", "is an asset owned is valued above $2 M?"). The verification authority or a server employed by the verification authority then interprets the queries and translates such loose queries into elaborate lower level queries resulting in partial or exact matches. This ability to interpret user queries or verification requests from a subset of fields in a combination certificate and translating such loose, high level or abstract queries into precise, elaborate and lower level queries makes it easier to verify certain certificates without requiring precise information or queries.

Figure 21:
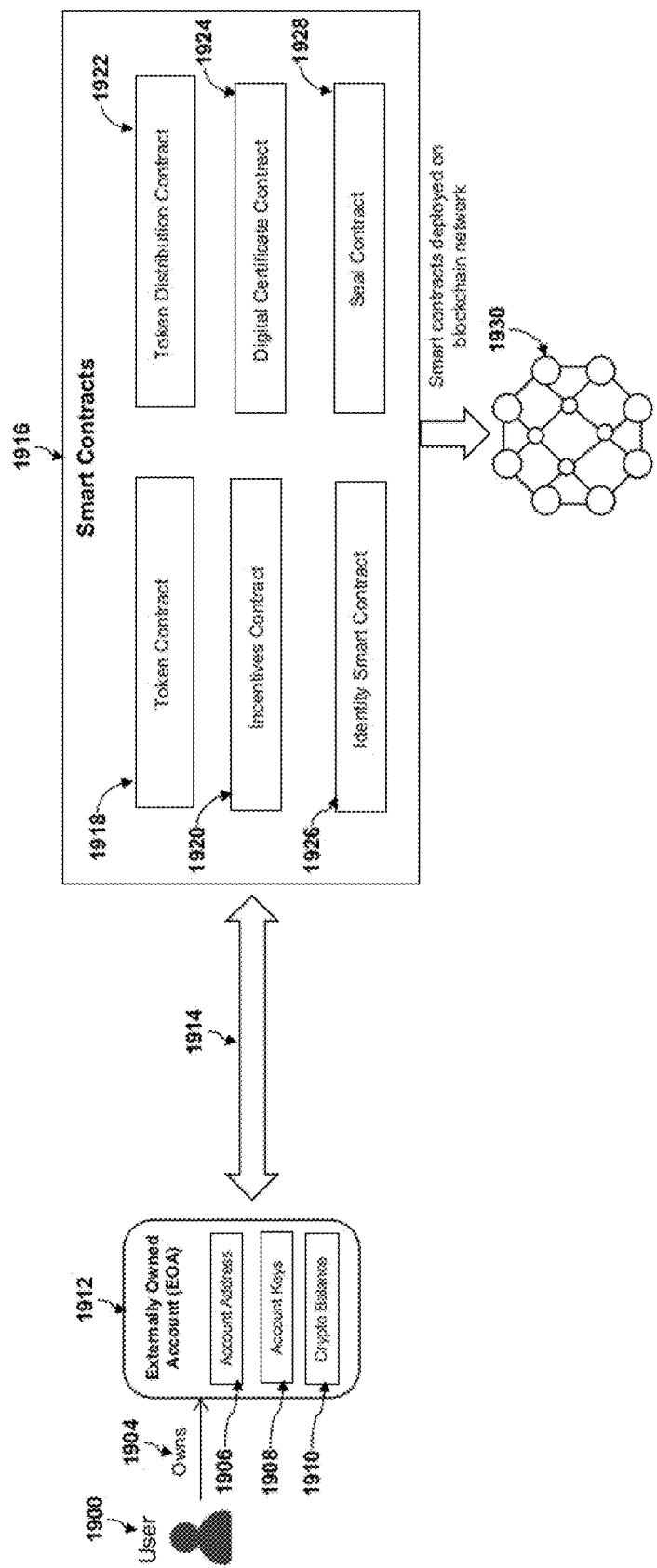
FIG. 21 is an illustration of the smart contracts involved in the CatchUp platform, according to an embodiment of the invention.

Referring now to FIG. 21 examples of smart contracts involved in the CatchUp platform are described in more detail. The CatchUp blockchain network 1930 is a distributed ledger which maintains records of all the transactions on the CatchUp platform. Users 1900 interact and transact with the blockchain network 1930 through Externally Owned Account (EOAs) 1912, which are owned and controlled by the users. Each EOA 1912 has an account address 1906, account public-private keys 1908 and a balance 1910 (in certain units of a Cryptocurrency associated with the Blockchain network) associated with it. EOAs do not have any associated code. All transactions on a blockchain network are initiated by EOAs. These accounts can send transactions to other EOAs or contract accounts. Another type of accounts support by second generation programmable Blockchain platforms are the Contract Accounts. Smart contracts 1916 contain the contract code which control the associated contract accounts. The smart contracts 1916 are deployed on the blockchain network 1930. The smart contracts 1916 involved in the CatchUp platform are as follows:

1) Token Contract 1918: Token Contract provides the CatchUp token definition including token name, symbol, decimal places, token supply, method for token transfer, and method for checking token balance of an account.

2) Token Distribution Contract 1922: Token Distribution Contract defines the token distribution and pricing model and contains methods for purchasing and claiming tokens, and methods for withdrawing token sale proceeds.

3) Incentives Contract 1920: Incentives Contract defines the incentives and triggers and methods for distributing incentives.

4) Identity Smart Contract 1926: Identity Smart Contract is used to link blockchain accounts to real users (borrowers or lenders).

5) Digital Certificate Contract 1924: Digital Certificate Contract is used in the process of certifying documents or objects on the blockchain.

6) Seal Contract 1928: Seal Contract is used in the process of certifying documents or objects on the blockchain.

Figure 22:
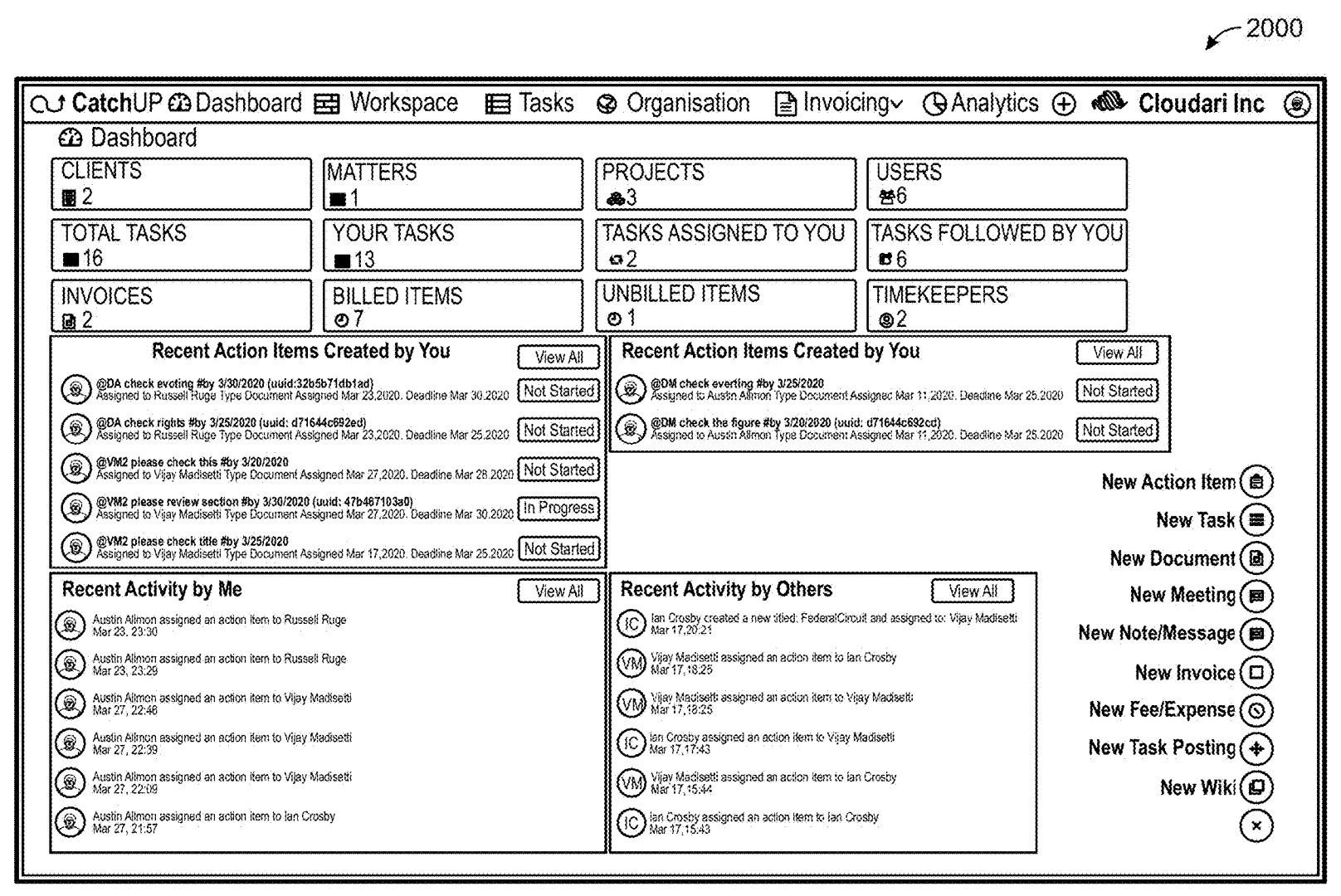

Referring now to FIG. 22 an exemplary interface 2000 of the CatchUp platform showing dashboard home page, is described in more detail. CatchUp enables effective collaboration within your business such as task scheduling, document management, file sharing, collaboration, real-time communications, reminders, calendar, wiki, resource planning, mapping to business and process-specific task flows, invoicing, advanced analytics, blockchain certifications and more. Within CatchUp each organization can have multiple clients. Each client can have multiple Business Specific Task Structures including matters, projects, tasks/actions, and users. CatchUp servers may have stored thereon client records containing information about each client in a client database, matter records containing about each matter in a matter database with each matter record being associated with a client record, project records containing information about each project in a project database with each project record being associated with a matter record, action records containing information about each action in an action database, and user records containing information about each user, In some embodiments, on or more of the client database, matter database, project database, action database, and user database may be in a single combined database, e.g. a CatchUp database.

CatchUp focuses on short term tasks that require coordination. Each task has a set of notes organized as a running timeline that is like a chat. Users can exchange notes for a particular task and add attachments to task notes. Each note may be received by the CatchUp server as a note record request to be stored with the action record associated with the task/action to which the note pertains. Each note record may comprise an authoring user and note content. When a note record request is received, a note record may be recorded to the associated action record, the note record comprising an authoring user being the user from which the note record request was received, and the note content being the content of the note. Note records may further comprise a link to at least one of a client record, a matter record, a project record, and an action record. The CatchUp server may display the note records for each action record on a user device in the order the note records were received. Users can provide immediate feedback, ask questions, request updates for tasks and add fee or expense items to tasks. The advanced analytics features in Catchup allow users to get a big picture on tasks and projects, generate a circle of knowledge and let the team members understand their roles. Users can share knowledge and unleash collective intelligence for your business through wiki and bulletin boards.

Figure 23:
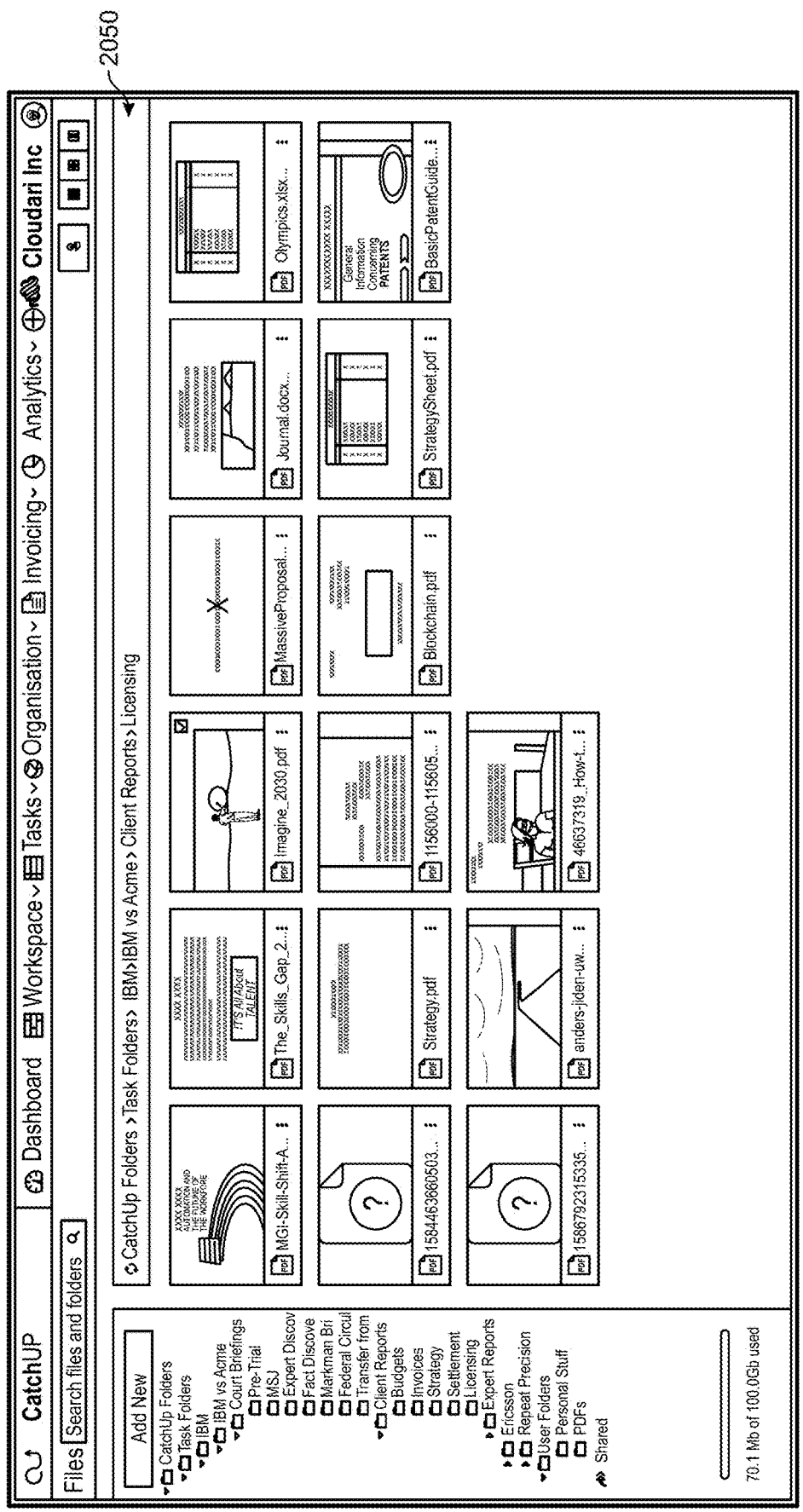
FIG. 23 is an exemplary interface of the CatchUp platform showing user and task folders with the document management system, according to an embodiment of the invention.

Referring now to FIG. 23 an exemplary interface 2050 of the CatchUp platform showing user and task folders with the document management system, is described in more detail. Catchup features an enterprise grade document management system to create, share and collaborate on documents in real-time. Within the documents view, users can browse documents within the task folders and user folders, view preview and details of a document and add comments to documents. The comments can either be visible to all users (public comments), or specific group of users (closed user group comments) or only a particular user (private comments). This selective visibility of comments is enabled by hashtags and mention codes within the comments.

Figure 24:
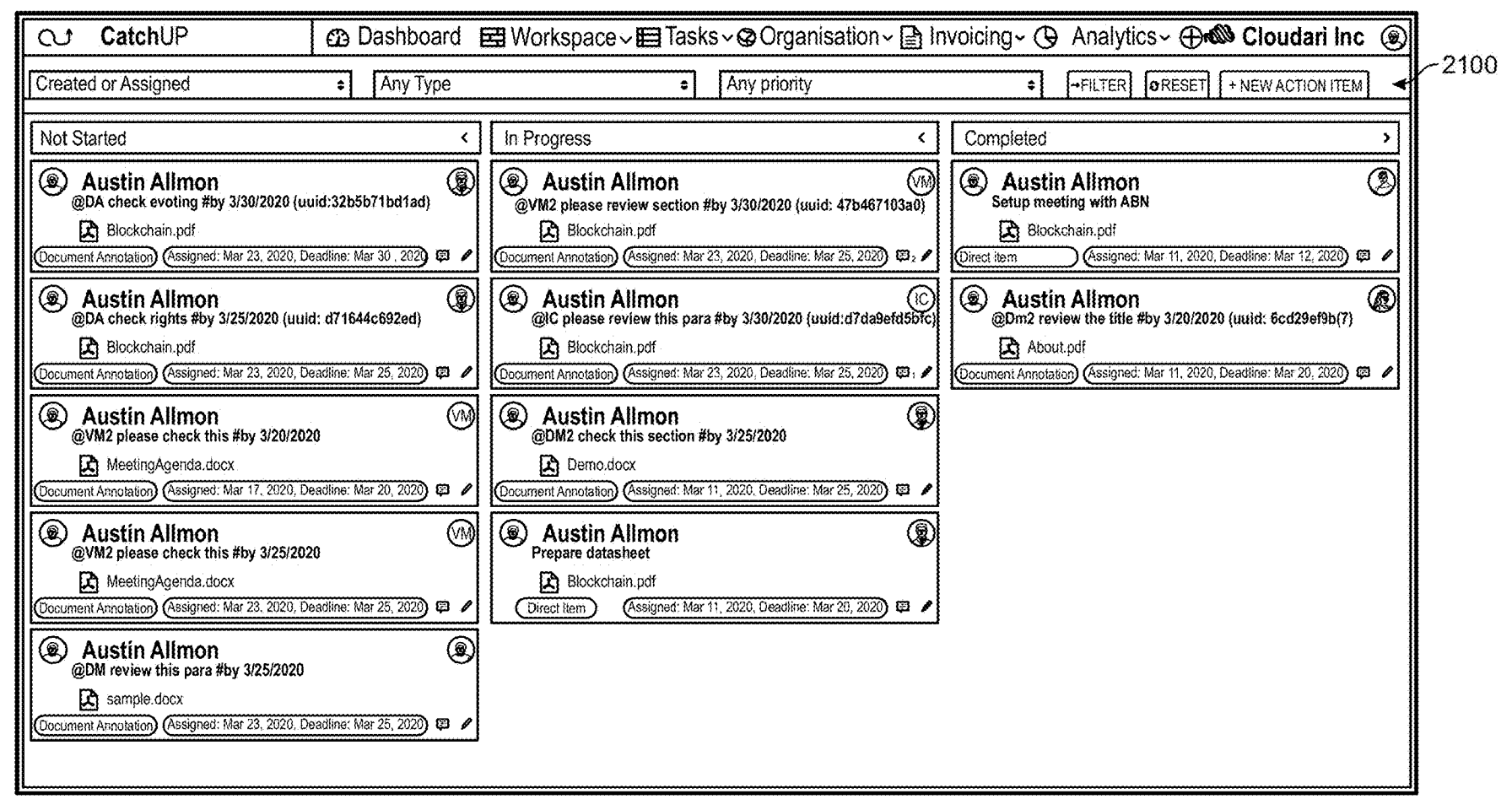

Referring now to FIG. 24 an exemplary interface 2100 of the CatchUp platform showing kanban view of action items, is described in more detail. In the kanban view the action items are organized into three columns: Not started, In progress and Completed. A user to whom an action item is assigned can update the status of an action item either by double clicking the item or by dragging and dropping the action item card to a different column. Users can add comments to action items. The comments can either be visible to all users (public comments), or specific group of users (closed user group comments) or only a particular user (private comments). This selective visibility of comments is enabled by hashtags and mention codes within the comments.

Figure 25:
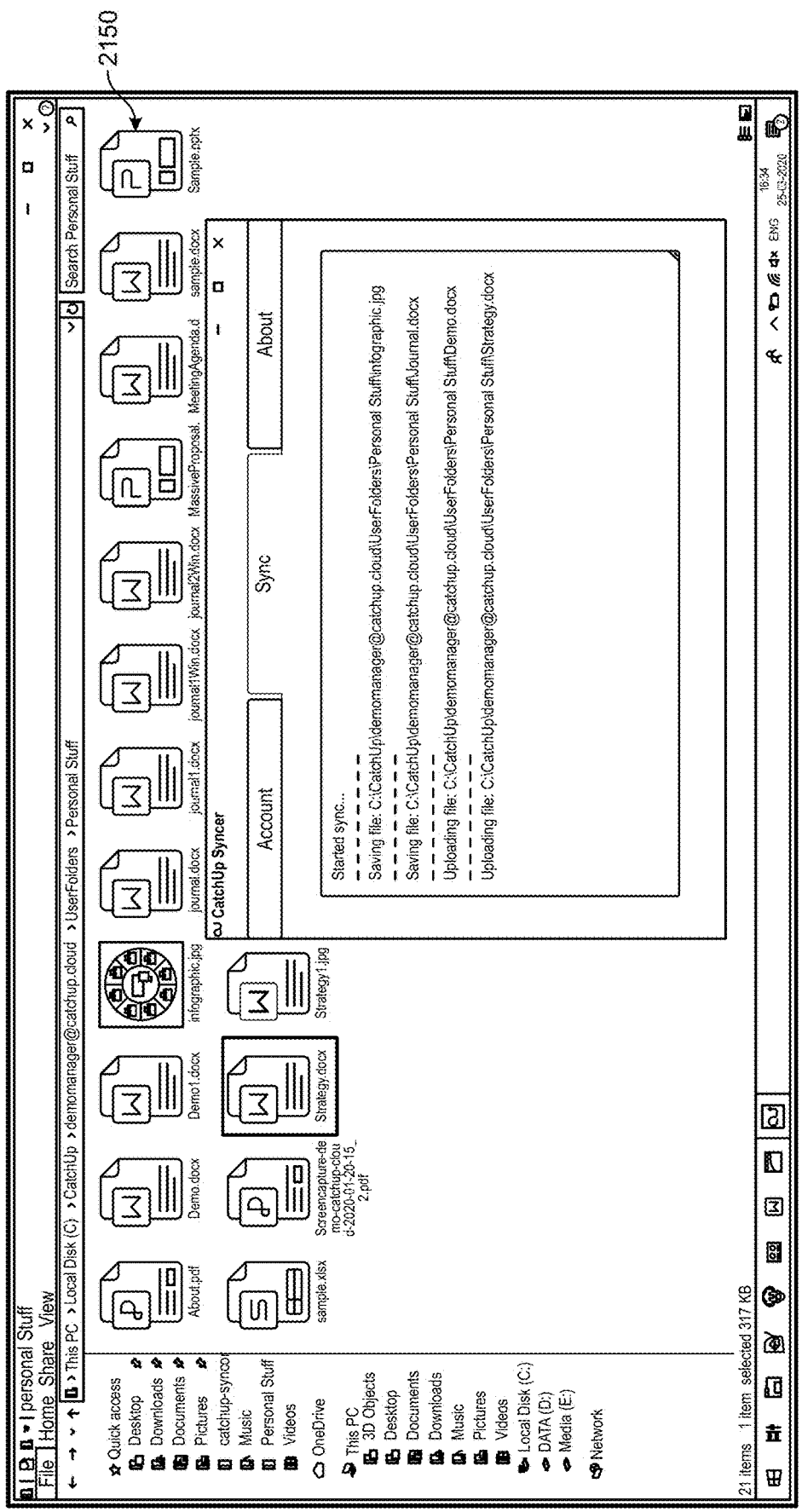
FIG. 25 is an exemplary interface of the CatchUp syncer application, according to an embodiment of the invention.

Referring now to FIG. 25 an exemplary interface 2150 of the CatchUp syncer application, according to an embodiment of the invention. CatchUp syncer is a desktop application which syncs CatchUp folders to user's desktop. CatchUp syncer supports two-way sync from Cloud to Local or from Local to Cloud. When a user launches the CatchUp syncer application and logs into his account the files in the user's Task Folders and User Folders in Catchup Cloud are synced to local machine. When any file is edited or updated in the user folders in Catchup Cloud the newer version of the file is synced to local machine. A user can open an Office document (docx, pptx, xlsx) in any desktop office application (such as MS Office or OpenOffice) and edit the document. When the document is saved it is synced to the CatchUp cloud. If a user copies a new file to a local sync folder the file is uploaded to the cloud.

Figure 26:
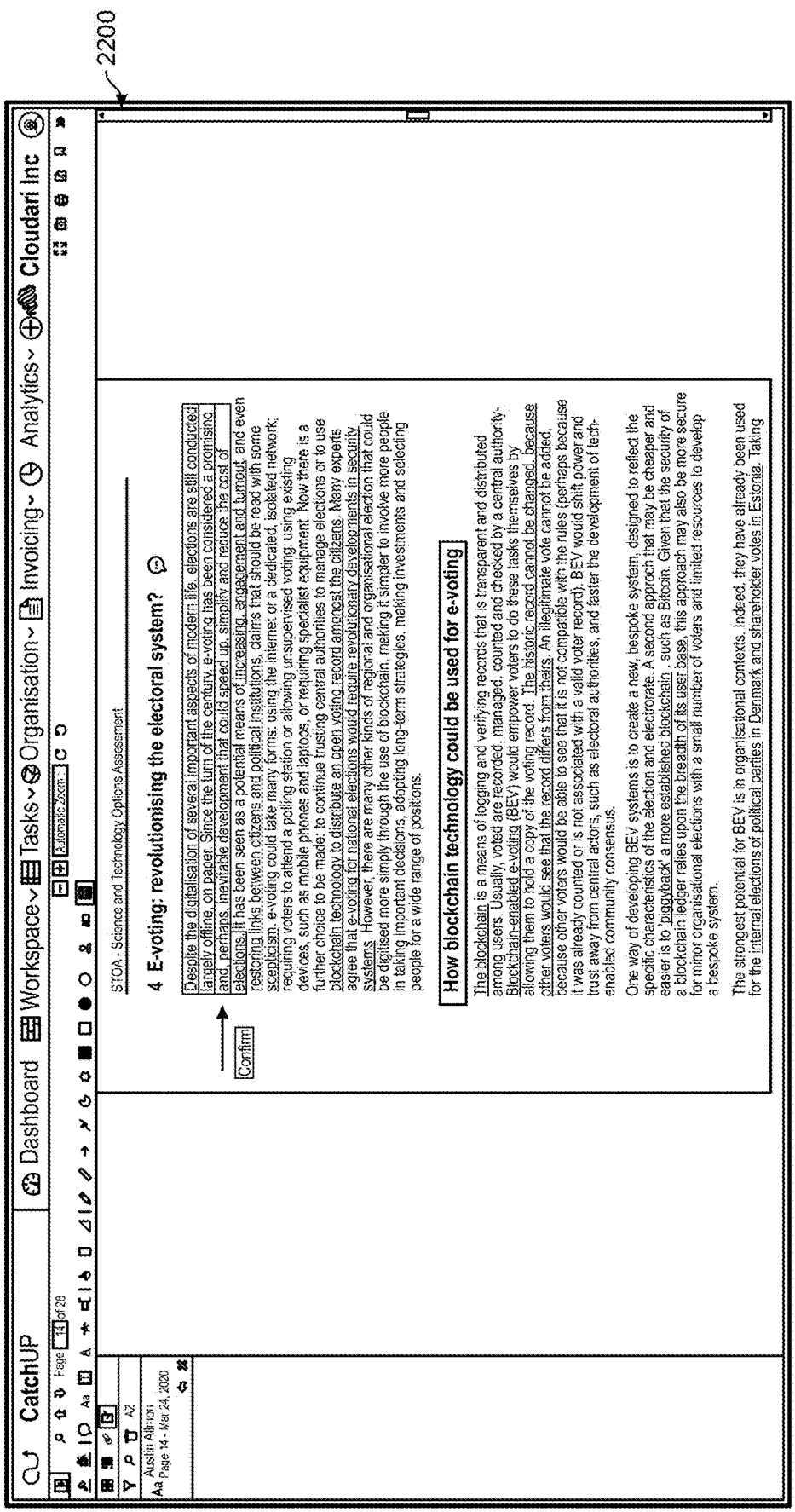
FIG. 26 is an exemplary interface of the CatchUp Glass Viewer for PDF documents, according to an embodiment of the invention.

Referring now to FIG. 26 an exemplary interface 2200 of the CatchUp Glass Viewer for PDF documents, is described in more detail. CatchUp Glass Viewer is a document editor application is used to view, edit, comment and annotate documents. The comments and annotations are saved separately outside the PDF document in a meta-data database within the CatchUp cloud. When a document is opened with the Glass Viewer the document is fetched from the cloud storage and comments/annotations are fetched from the meta-data database and rendered in a layer above the document. Such an opening of a document may be detected by the CatchUp server.

Figure 27:
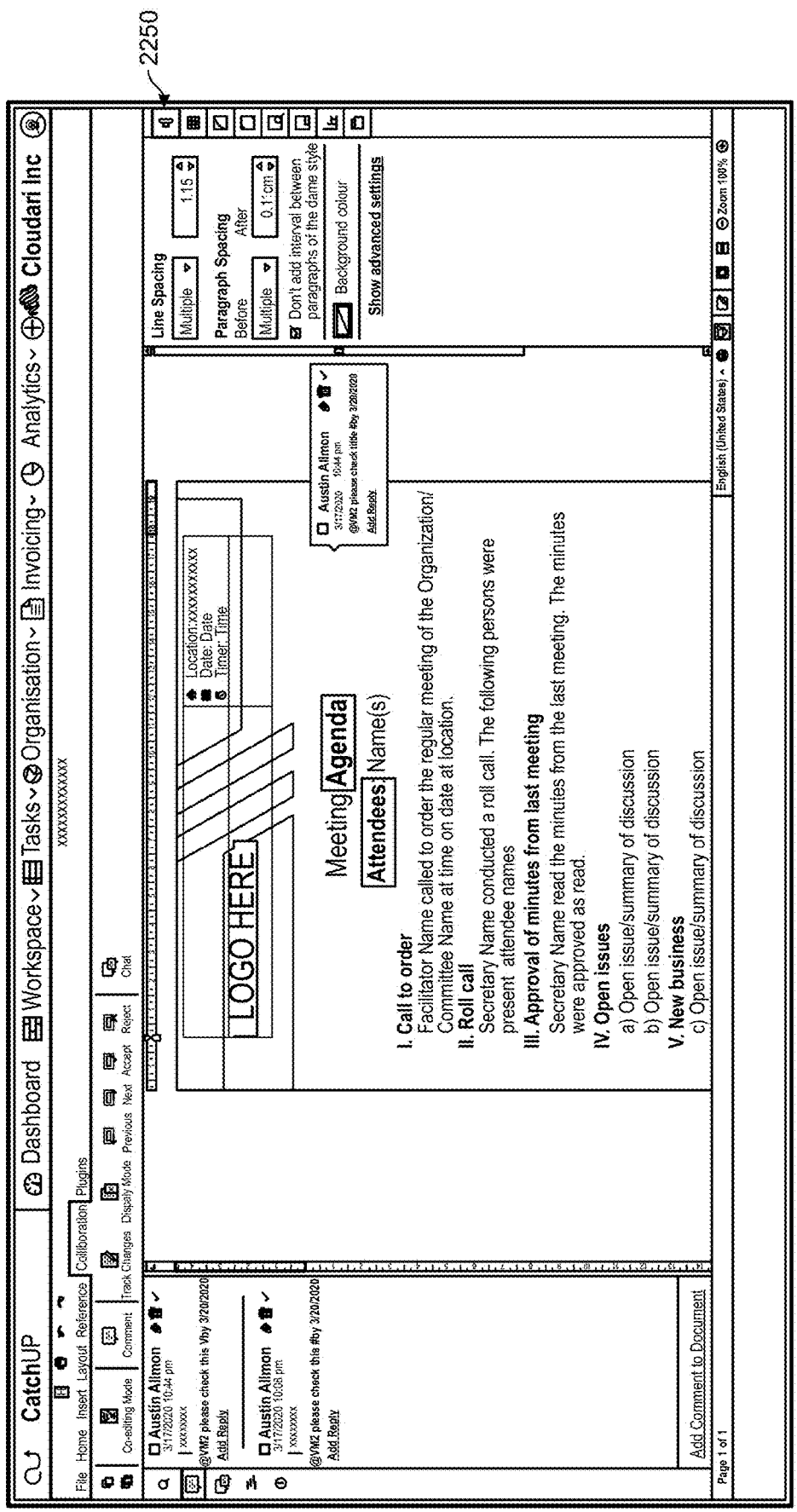
FIG. 27 is an exemplary interface of the CatchUp Glass Viewer for office format documents, according to an embodiment of the invention.

Referring now to FIG. 27 an exemplary interface 2250 of the CatchUp Glass Viewer for office format documents, is described in more detail. The Glass Viewer enables comments and annotations to be saved separately outside the Word document in a meta-database within the Catch-Up cloud. When a document is opened with the Glass Viewer the document is fetched from the cloud storage and comments/annotations are fetched from the meta-data database and rendered in a layer above the document.

Figure 28:
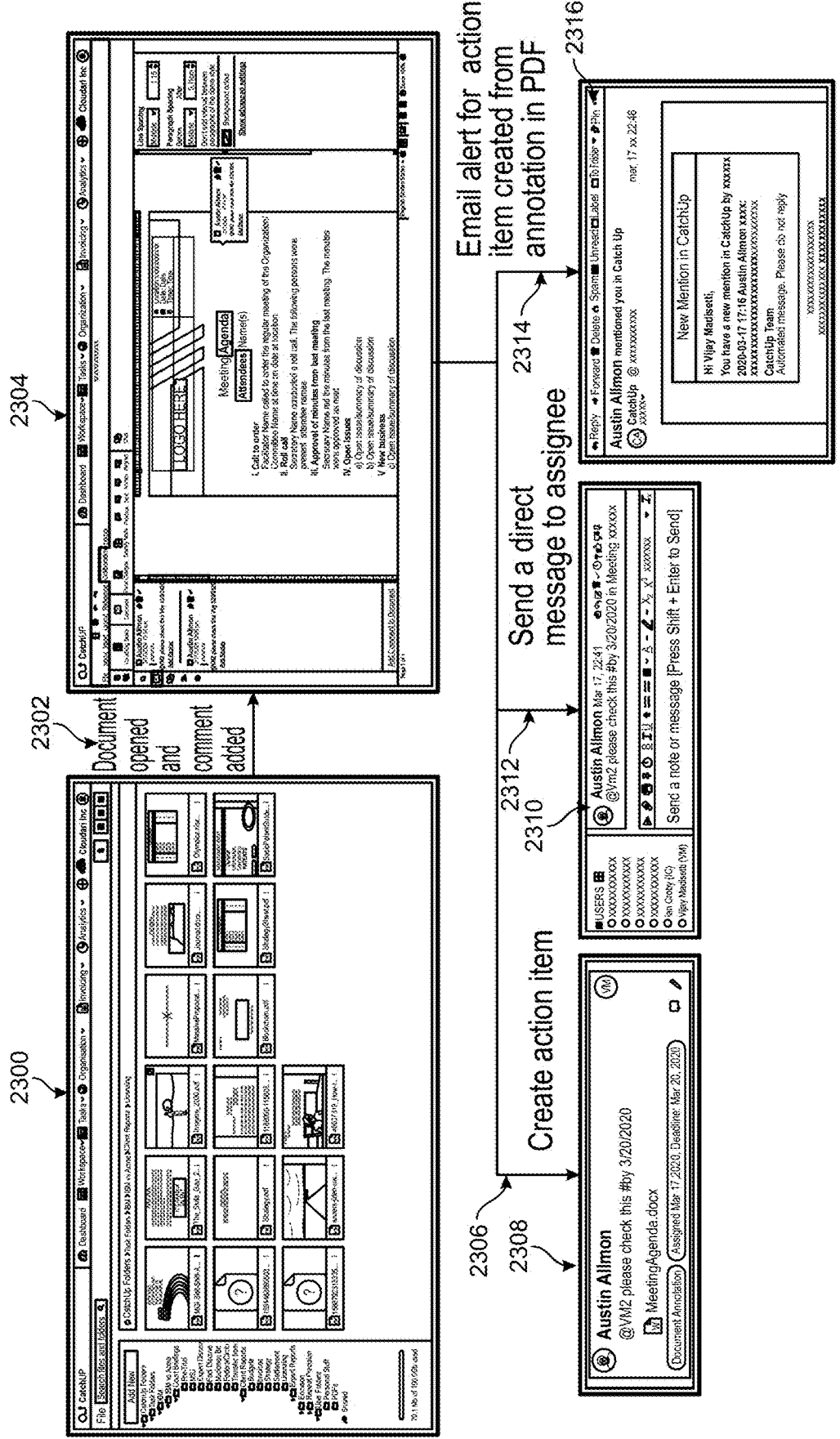
FIG. 28 is an illustration of the online process for creating action items and alerts from comments in office documents, according to an embodiment of the invention.

Referring now to FIG. 28 an illustration of the online process for creating action items and alerts from comments in office documents, is described in more detail. A user can browse a document within the user or task folders using the CatchUp document management interface 2300 and open a PDF or Office format document 2302 in CatchUp GlassViewer web application 2304 and add comments and/or annotations to the document. Within a comment/annotation the user can mention another user and assign some action item with deadline and optional number of hours. For example, "@AB spend #hours 2-3 on reviewing this section #by Mar. 25, 2020". When the comments/annotations are saved the comments/annotations are parsed and action items are created 2306. Comment/annotation records may be saved in a meta-database as described in detail below. The action item can be seen from the Kanban view 2308. The CatchUp Server can send 2312 a direct message to the user with the CatchUp messaging view 2310 and the server may also send 2314 an email alert 2316 when the action item is created.

Figure 29:
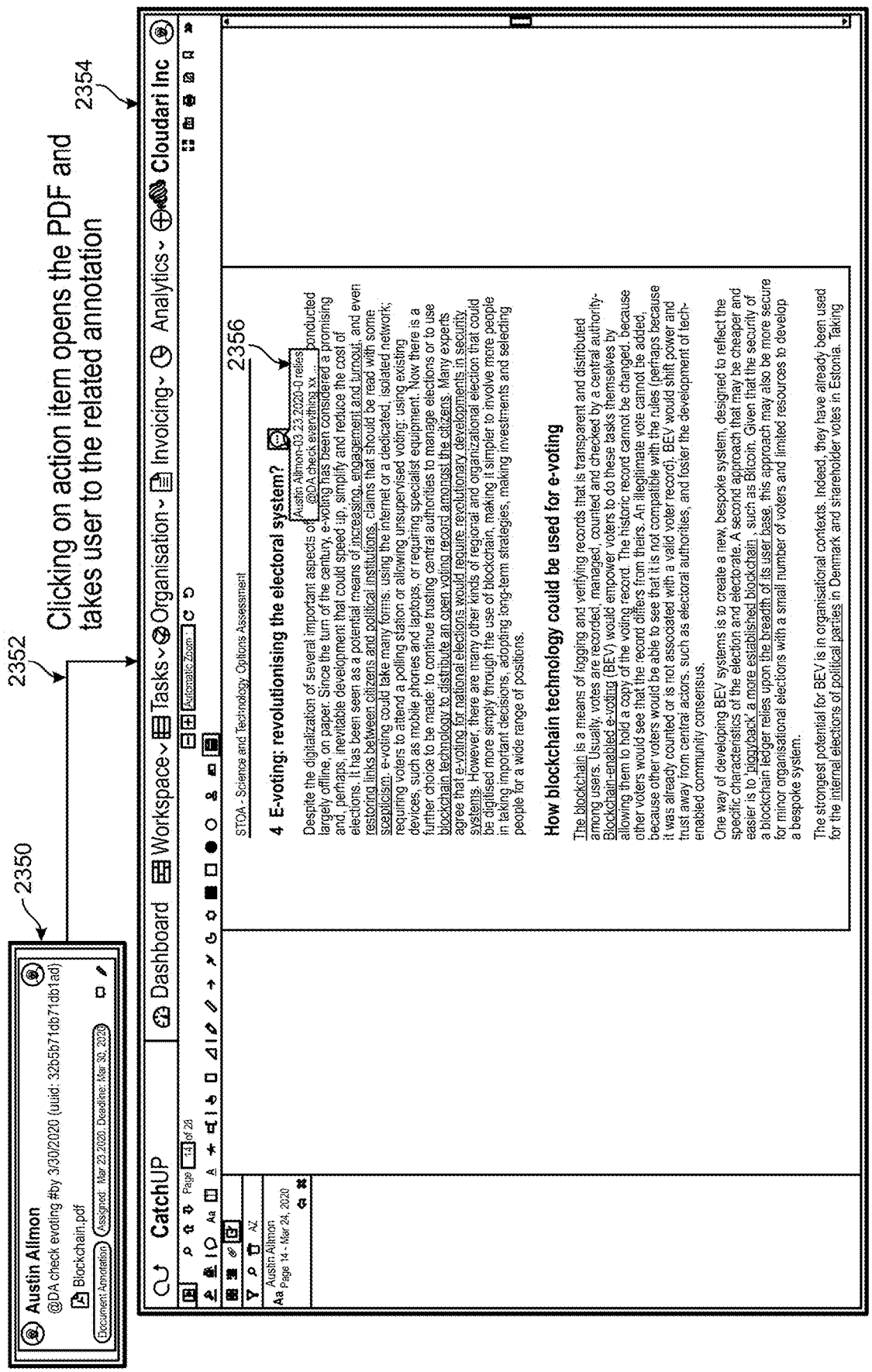
FIG. 29 is an illustration of the linking between an action item and the corresponding annotation within a document, according to an embodiment of the invention.

Referring now to FIG. 29 an illustration of the linking between an action item and the corresponding annotation within a document, is described in more detail. From the Kanban view 2350, when the user clicks an action item 2352, it opens the document within the CatchUp Glass Viewer 2354 by requesting and receiving the associated document from the CatchUp server and jumps directly to the related annotation/comment 2356.

Figure 30:
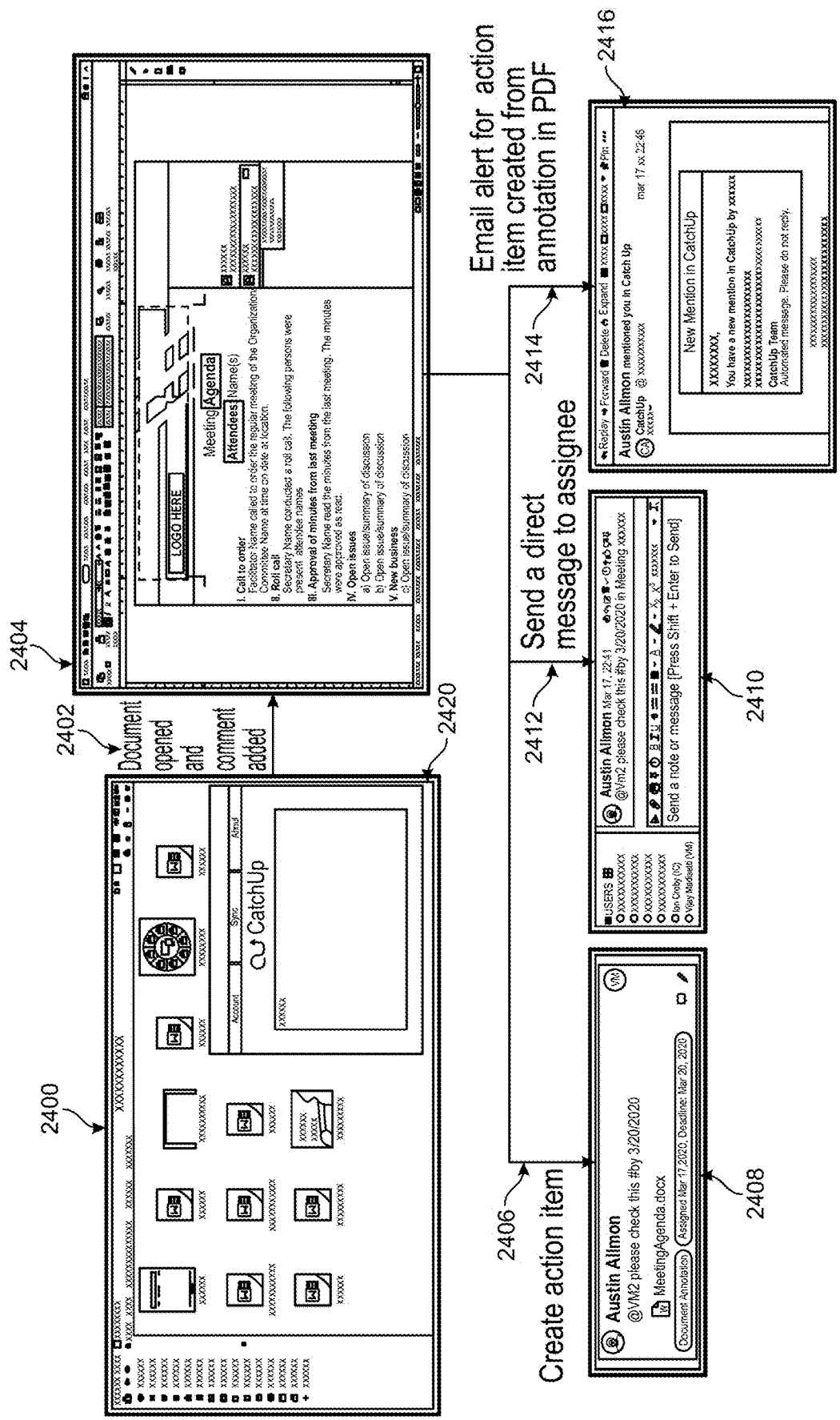
FIG. 30 is an illustration of the offline process for creating action items and alerts from comments in office documents, according to an embodiment of the invention.

Referring now to FIG. 30 an illustration of the offline process for creating action items and alerts from comments in office documents, is described in more detail. A user can browse documents within the user or task folders synchronized to the user's local machine 2400 using the CatchUp syncer application 2420 and open a PDF or Office format document in a native desktop application 2404 and add comments and annotations to the document. Within a comment the user can mention another user and assign some action item with deadline and optional number of hours. For example, "@AB spend #hours 2-3 on reviewing this section #by Mar. 25, 2020". When the document is saved it is synced to the CatchUp cloud by the CatchUp syncer application 2420. The comments from the synced document are parsed and action items are created 2406. The action item can be seen from the Kanban view 2408. The CatchUp server may send a direct message 2412 with the CatchUp messaging view 2410 and may also send 2414 an email alert 2416 when the action item is created.

Figure 31:
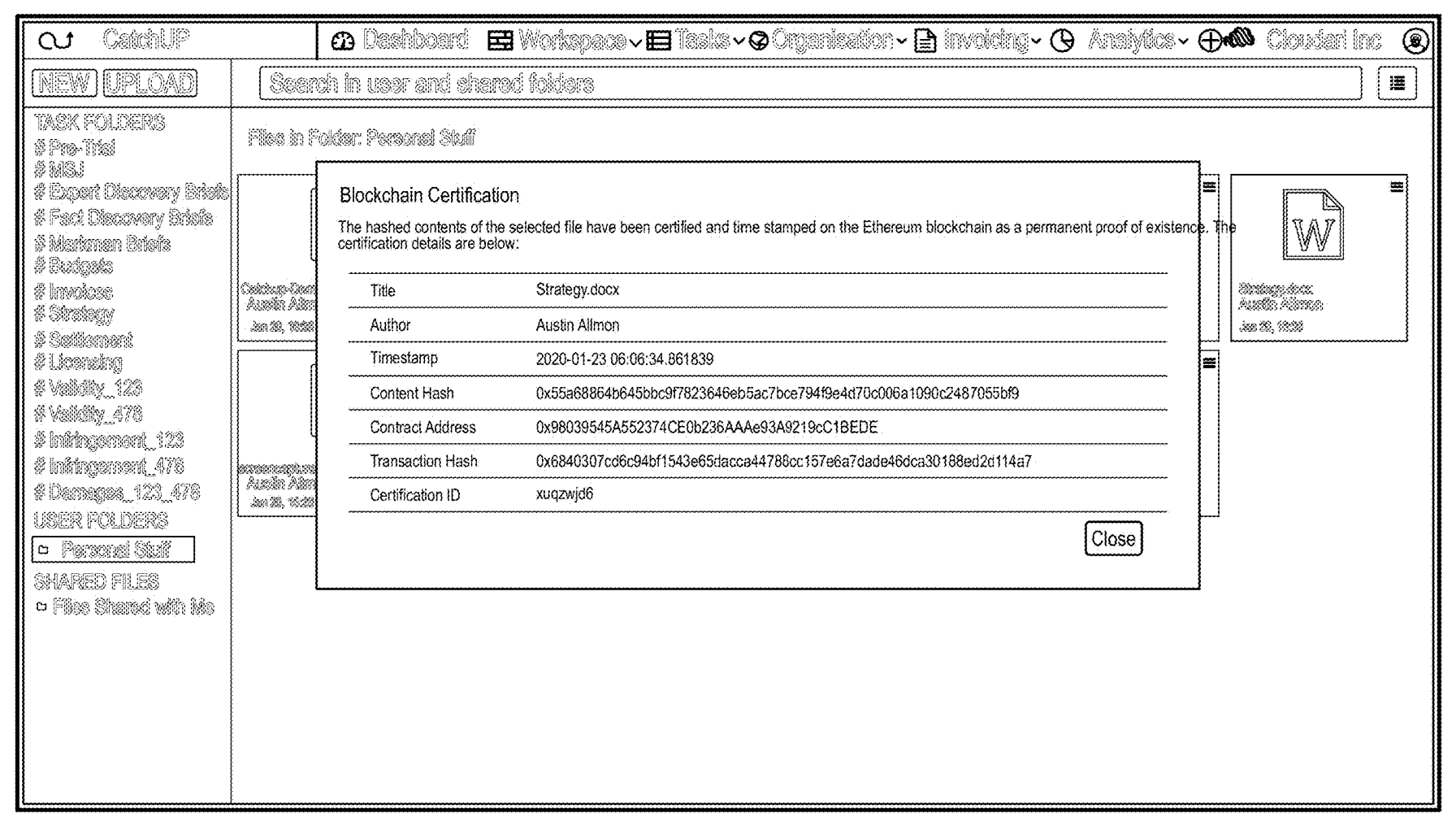

Referring now to FIG. 31 an exemplary interface of the CatchUp platform showing blockchain certification for a document, is described in more detail. CatchUp allows certifying and timestamping documents and notes on a blockchain network to establish a combined proof of ownership, existence, custody and integrity. Such certification may be received by transmitting a blockchain transaction to a blockchain network and receiving certification, in some embodiments receiving such certification after the transaction has been accepted according to the consensus algorithm of the network.

Referring now to FIG. 32 an exemplary interface of the CatchUp platform showing task notes and real-time communication, is described in more detail. CatchUp focuses on short term tasks that require coordination. Tasks can be filtered by user (creator, assignee or follower), client, project, matter and tags. Tasks have a set of notes organized as a running timeline that is like a chat. Attachments can be added to the task notes. Users can provide immediate feedback, ask questions, request updates for tasks and add fee or expense items to tasks.

Figure 33:
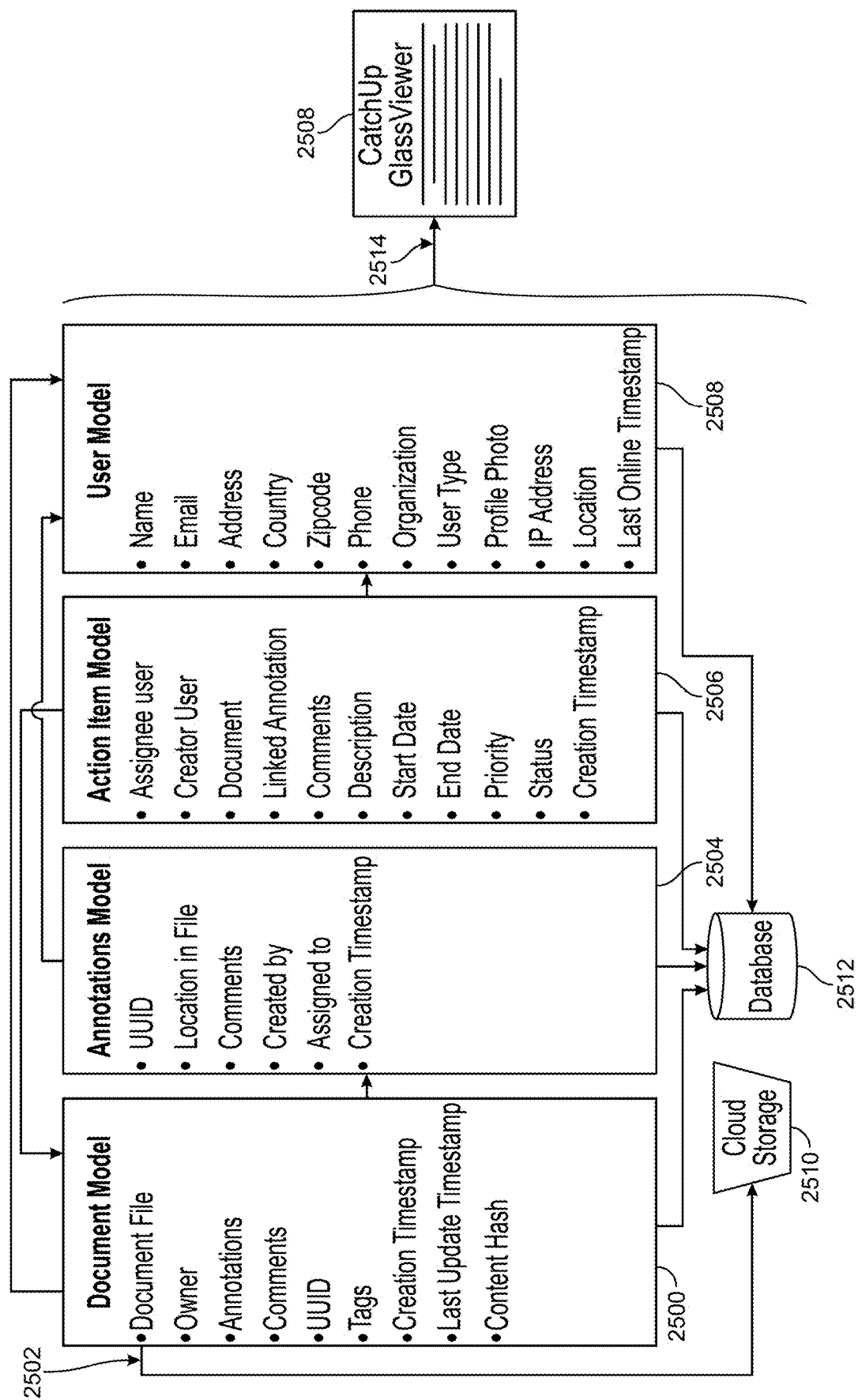
FIG. 33 is a schematic view of data structures maintained within CatchUp for annotations and action items linked to documents, according to an embodiment of the invention.

Referring to FIG. 33, data structures maintained within CatchUp for annotations and action items linked to documents, are described in more detail. The document model data structure 2500 includes a link to the document file which is stored in a Cloud Storage 2510, and additional fields such as Owner, Annotations, Comments, UUID, Tags, Creation Timestamp, Last Update Timestamp and Content Hash. The document annotations are stored in a separate Annotations model 2504. The Annotation model 2504 includes fields such as UUID, Location in File, Comments, Created by, Assigned to and Creation Timestamp. The Actions Items created by processing annotations and comments are stored in the Action Item Model 2506. The Action Item model 2506 includes fields such as Assignee User, Creator User, Document, Linked Annotation, Comments, Description, Start Date, End Date, Priority, Status, and Creation Timestamp. The Document, Annotations and Action Item models reference the User Model 2508 which includes fields such as Name, Email, Address, Country, Zipcode, Phone, Organization, User Type, Profile Photo, IP Address, Location, and Last Online Timestamp. While the document file is stored in cloud storage 2510, the document meta-data and annotations are stored in a database 2512. When a document is accessed within the CatchUp Glassviewer, the annotations are rendered in a layer above the document at specific locations.

The linked data structures allow optimization of resources and speed up computer operations through the merged processing and allocation of faster storage to the more frequent tasks and documents. The use of the multiple data structures and linking between them greatly improves the operation of the computing system, since extensive searching, lookup and calculation is avoided through use of these dynamic links that are evaluated through the linked structures. Unlike previous approaches the linked data structures show which files are most used by the user and can be used to store these files in online and faster storage. Also, files used in secure events can be stored more securely. The linked tables allow offloading to specialized processors and learning networks resulting in 30-50 percent improvement in computer performance.

Throughout the application, reference may be made to various computer hardware, including servers, storage, cloud storage, and the like. It is contemplated and included within the scope of the invention that the CatchUp system and its various components may be software executed on computer devices, including servers, personal computers, smartphone devices, and the like, each comprising a processor configured to execute commands received from software (such as microprocessors, field-programmable gate arrays, integrated circuits, and the like), a storage medium positioned in electrical communication with the processor and operable to store software and other digital information thereupon in one or both of transitory and non-transitory status (such as hard disk drives, solid state drives, flash drives, compact flash drives, SD drives, memory, and the like), and a network communication device operable to communicate across computer networks as are known in the art, including, but not limited to, wide area networks such as the Internet and mobile data networks, local area networks such as Ethernet and Wi-Fi networks, and personal area networks such as Bluetooth networks. Accordingly, it is contemplated and included within the scope of the invention that the computer hardware performing the above-described CatchUp functions includes hardware necessary for such performance as is known in the art.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A server for collaborating in real-time via action creation comprising:
a storage medium having stored thereon:
a user database comprising a plurality of users;
a client database comprising a plurality of client records;
a matter database comprising a plurality of matter records with each matter record being associated with a client record;
a project database comprising a plurality of project records with each project record being associated with a matter record; and
an action database comprising a plurality of action records;
a network communication device configured to:
receive an indication a user has opened a managed document; and
receive an annotation associated with the managed document, the annotation comprising:
a location of the annotation within the managed document;
a comment;
a creating user; and
an assigned user;
a processor operatively coupled to each of the storage medium and the network communication device, the processor being configured to:
parse the annotation to identify each of the assigned user and the creating user and to generate a received action from the comment;
generate an action record responsive to information identified from parsing the annotation, the action record comprising:
at least one of:
a received client being a client of the plurality of clients;
a received matter being a matter of the plurality of matters that is associated with the received client; and
a received project being a project of the plurality of projects that is associated with the received matter;
the received action; and
the assigned user;
record a generated action record to the action database comprising:
at least one of:
a link to the client record associated with the received client;
a link to the matter record associated with the received matter; and
a link to the project record associated with the received project;
the received action;
a link to the user record associated with the assigned user;
a link to a user record from which the record creation request was received, defining a creating user; and
an assignment date being the date the action record creation request was received; and
record the action record to the action database;
wherein each user of the plurality of users can access the action database and retrieve action records for which they are the assigned user; and
wherein the annotation does not change the file content of the stored inbound document.

2. The server of claim 1 wherein the processor is configured to send a message to the assigned user using at least one of email and a messaging service via the network communication device.

3. The server of claim 1 wherein each action record comprises a plurality of note records, each note record comprising an authoring user and note content, wherein:
the network communication device is further configured to receive a note record request from a user comprising received note content for the generated action record; and
the processor is further configured to:
record a note record to the generated action record, the note record comprising:
an authoring user being the user from which the note record request was received; and
the received note content;
send the plurality of note records comprised by an action record for display on a user device in the order the plurality of note records were created via the network communication device.

4. The server of claim 3 wherein the note content comprises a link to at least one of a client record, a matter record, a project record, and an action record.

5. The server of claim 1 wherein each managed document is associated with a client record of the client database, a project record of the project database, and a matter record of the matter database; and wherein the links to the client record, matter record, and project record for the generated action record are generated responsive to the client record, matter record, and project record associated with the managed document.

6. The server of claim 1 wherein the processor is configured to identify the associated user from the annotation when the annotation is received.

7. The server of claim 1 wherein the processor is further configured to identify the action when the annotation is received.

8. The server of claim 1 wherein the generated action record further comprises a link to a managed document, defined as a linked managed document, wherein the network communication device is further configured to:
receive a user input selecting the generated action record from a user device; and
transmit a command to the user device to open the linked managed document.

9. The server of claim 1 wherein:
the network communication device is further configured to:
transmit the generated action record to a blockchain network at a blockchain address for recordation thereon; and
receive blockchain certification information responsive to recording the generated action record on the blockchain network; and
wherein the processor is further configured to add the blockchain certification information to the generated action record.

10. The server of claim 1 wherein the network communication device is further configured to:
receive an indication the user has opened the managed document; and
receive an indication an annotation was added to the managed document;
wherein the indications are received at the server via REST over HTTP.

11. The server of claim 1 wherein:
the processor is further configured to generate a Kanban view comprising each action record assigned to a user; and
the network communication device is configured to transmit the Kanban view to the user assigned to the action records comprised by the Kanban view.

* * * * *